US012515228B2

(12) United States Patent
Bliss

(10) Patent No.: US 12,515,228 B2
(45) Date of Patent: Jan. 6, 2026

(54) JETTING NEEDLE INTEGRATION WITH FLUID JETTING VALVE AND METHODS THEREOF

(71) Applicant: NORDSON CORPORATION, Westlake, OH (US)

(72) Inventor: Craig Bliss, Taunton, MA (US)

(73) Assignee: Nordson Corporation, Westlake, OH (US)

( * ) Notice: Subject to any disclaimer, the term of this patent is extended or adjusted under 35 U.S.C. 154(b) by 927 days.

(21) Appl. No.: 17/665,919

(22) Filed: Feb. 7, 2022

(65) Prior Publication Data

US 2022/0250099 A1 Aug. 11, 2022

Related U.S. Application Data

(60) Provisional application No. 63/148,339, filed on Feb. 11, 2021.

(51) Int. Cl.

| | |
|---|---|
| ***B05B 1/30*** | (2006.01) |
| ***B05B 1/02*** | (2006.01) |
| ***B05B 13/02*** | (2006.01) |

(52) U.S. Cl.

CPC .............. *B05B 1/3046* (2013.01); *B05B 1/02* (2013.01); *B05B 13/0278* (2013.01)

(58) Field of Classification Search

CPC ...... B05B 1/3046; B05B 1/02; B05B 13/0278

USPC ........................... 239/583, 584, 102.1, 102.2

See application file for complete search history.

(56) References Cited

U.S. PATENT DOCUMENTS

| | | | | |
|---|---|---|---|---|
| 5,763,278 | A * | 6/1998 | Sickinger | B01L 3/0268 73/863.44 |
| 8,578,729 | B2 * | 11/2013 | Fiske | B05C 5/0237 62/389 |
| 2008/0315145 | A1 * | 12/2008 | Kawamura | H01M 8/04089 251/366 |
| 2014/0197210 | A1 * | 7/2014 | Dunlap | B05C 5/0291 222/509 |
| 2016/0341589 | A1 * | 11/2016 | Doering | G01F 11/30 |
| 2017/0363590 | A1 * | 12/2017 | Dourdeville | B01L 3/0241 |

* cited by examiner

*Primary Examiner* — Steven J Ganey

(74) *Attorney, Agent, or Firm* — BakerHostetler

(57) ABSTRACT

A fluid body for use with a jetting dispenser may include a fluid inlet for receiving the fluid from a source; a fluid outlet for discharging the fluid from the fluid body; a chamber defined between the fluid inlet and outlet and configured to receive the fluid therein; a valve seat in the chamber, the fluid outlet extending through the valve seat; a valve element for reciprocal movement within the chamber between a first position, in which the valve element contacts the valve seat, and a second position, in which the valve element is spaced from the valve seat; a dispensing needle separable from the fluid body and configured to receive the fluid from the fluid outlet; and a retaining nut configured to releasably secure the dispensing needle to the fluid body such that the dispensing needle contacts the fluid body adjacent the fluid outlet.

33 Claims, 21 Drawing Sheets

JETTING NEEDLE INTEGRATION WITH FLUID JETTING VALVE AND METHODS THEREOF

TECHNICAL FIELD

This disclosure generally relates to devices and methods of dispensing materials onto substrates, and more particularly relates to jetting dispensers having needles and easily accessible components.

BACKGROUND

Non-contact viscous material dispensers are often used to apply minute amounts of viscous materials onto substrates. For example, non-contact viscous material dispensers are used to apply various viscous materials onto electronic substrates like printed circuit boards. Materials applied to electronic substrates include, by way of example and not by limitation, general purpose adhesives, ultraviolet curable adhesives, solder paste, solder flux, solder mask, thermal grease, lid sealant, oil, encapsulants, potting compounds, epoxies, die attach fluids, silicones, RTV (room-temperature-vulcanizing silicone), cyanoacrylates, and/or the like.

Jetting dispensers generally may have pneumatic or electric actuators for moving a shaft or tappet repeatedly toward a seat while jetting a droplet of viscous material from an outlet orifice of the dispenser. The electrically actuated jetting dispensers can, more specifically, use a piezoelectric actuator.

Existing jetting dispenser designs often do not have arrangements for adequate and/or easy access to properly clean all required surfaces of components. As such, the user often must disassemble multiple parts of the jetting system to access the components that need to be cleaned. This requires time and additional tools, which results in increased costs, increased downtime, reduced efficiency, and/or the like.

Additionally, existing jetting dispenser systems often utilize dispensing nozzles that do not fit into small or tight components, which limits their applications. Furthermore, conventional systems allow for air to become trapped therein, which decreases the accuracy and precision of the dispensed material, can degrade the structural properties of the dispensed material, and/or like performance issues. Additionally, some dispensing components may receive coatings thereon to facilitate dispensing or jetting of the material, but such coatings often cause undesirable droplets to be formed, further reducing accuracy and precision of material application.

For at least these reasons, it would be desirable to provide a jetting system and method that addresses these and other issues.

SUMMARY

The foregoing needs are met by the various aspects of jetting systems, dispensing needles, coating tools, and methods disclosed. According to an aspect of the disclosure, a fluid body for use with a jetting dispenser is disclosed. The fluid body is configured to receive a fluid therein and to jet the fluid therefrom. The fluid body includes a fluid inlet configured to receive the fluid from a fluid source; a fluid outlet configured to discharge the fluid from the fluid body; a chamber defined between the fluid inlet and the fluid outlet and configured to receive the fluid therein; a valve seat disposed in the chamber, the fluid outlet extending through the valve seat; a valve element configured for reciprocal movement within the chamber between a first position, in which the valve element is in contact with the valve seat, and a second position, in which the valve element is spaced from the valve seat; a dispensing needle separable from the fluid body and configured to receive the fluid from the fluid outlet; and a retaining nut configured to releasably secure the dispensing needle to the fluid body such that the dispensing needle contacts the fluid body adjacent the fluid outlet.

According to another aspect, a jetting system is disclosed that includes a fluid body and a jetting dispenser. The fluid body can include a fluid inlet configured to receive the fluid from a fluid source; a fluid outlet configured to discharge the fluid from the fluid body; a chamber defined between the fluid inlet and the fluid outlet and configured to receive the fluid therein; a valve seat disposed in the chamber, the fluid outlet extending through the valve seat; a valve element configured for reciprocal movement within the chamber between a first position, in which the valve element is in contact with the valve seat, and a second position, in which the valve element is spaced from the valve seat; a dispensing needle separable from the fluid body and configured to receive the fluid from the fluid outlet; and a retaining nut configured to releasably secure the dispensing needle to the fluid body such that the dispensing needle contacts the fluid body adjacent the fluid outlet. The jetting dispenser has an actuator configured to cause reciprocal movement of the valve stem towards and away from the valve seat to cause the fluid material in the fluid chamber to be moved out of the fluid outlet and into the dispensing needle.

According to another aspect, a needle coating holder for applying a coating to a dispensing needle for use with a jetting system is disclosed. The needle coating holder includes a body defining a chamber therein that is configured to receive the coating; a needle holding plate adjacent to the chamber, the needle holding plate defining an aperture extending therethrough, the aperture being configured to receive the dispensing needle therein; and a cover selectively placeable in contact with the dispensing needle disposed in the needle holding plate. An air-tight seal is formed between the cover and a needle inlet of the dispensing needle when the cover is placed in contact with the dispensing needle.

According to another aspect, a fluid body for use with a jetting dispenser may include a fluid inlet configured to receive the fluid from a fluid source; a fluid outlet configured to discharge the fluid from the fluid body; a chamber defined between the fluid inlet and the fluid outlet and configured to receive the fluid therein; a valve seat disposed in the chamber, the fluid outlet extending through the valve seat; a valve element configured for reciprocal movement within the chamber between a first position, in which the valve element is in contact with the valve seat, and a second position, in which the valve element is spaced from the valve seat; a dispensing needle separable from the fluid body and configured to receive the fluid from the fluid outlet; and a retaining component configured to releasably secure the dispensing needle to the fluid body such that the dispensing needle contacts the fluid body adjacent the fluid outlet.

According to another aspect, a fluid body for use with a jetting dispenser may include a fluid inlet configured to receive the fluid from a fluid source; a fluid outlet configured to discharge the fluid from the fluid body; a chamber defined between the fluid inlet and the fluid outlet and configured to receive the fluid therein; a valve seat disposed in the chamber, the fluid outlet extending through the valve seat; a valve element configured for reciprocal movement within the chamber between a first position, in which the valve element is in contact with the valve seat, and a second position, in which the valve element is spaced from the valve seat; and a dispensing needle separable from the fluid body and configured to receive the fluid from the fluid outlet. The dispensing needle may include a coating thereon, the coating configured to reduce surface tension.

BRIEF DESCRIPTION OF THE DRAWINGS

The present application is further understood when read in conjunction with the appended drawings. For the purpose of illustrating the subject matter, exemplary aspects of the subject matter are shown in the drawings; however, the presently disclosed subject matter is not limited to the specific methods, devices, and systems disclosed. In the drawings.

DETAILED DESCRIPTION OF ILLUSTRATIVE EMBODIMENTS

Figure 1:
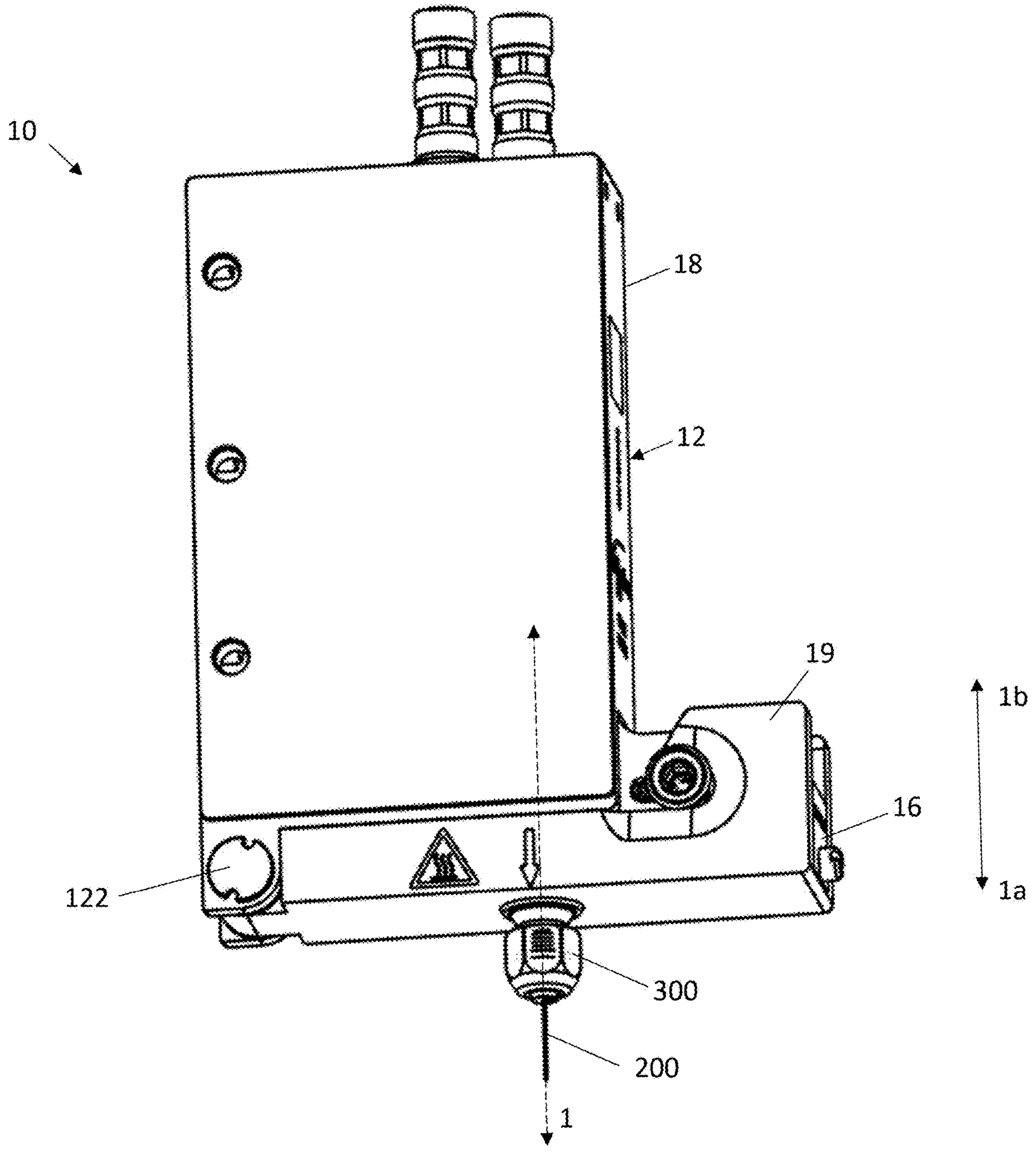
FIG. 1 illustrates a perspective view of a jetting system according to an aspect of this disclosure.

Aspects of the disclosure will now be described in detail with reference to the drawings, wherein like reference numbers refer to like elements throughout, unless specified otherwise.

Certain terminology is used in the description for convenience only and is not limiting. The words "proximal" and "distal" generally refer to positions or directions toward and away from, respectively, an individual using the mixing system. The words "axial", "vertical", "transverse", "left", "right", "above," and "below" designate directions in the drawings to which reference is made. The term "substantially" is intended to mean considerable in extent or largely but not necessarily wholly that which is specified. The terminology includes the above-listed words, derivatives thereof and words of similar import.

When values are expressed as approximations by use of the antecedent "about," it will be understood that the particular value forms another embodiment. In general, use of the term "about" indicates approximations that can vary depending on the desired properties sought to be obtained by the disclosed subject matter and is to be interpreted in the specific context in which it is used, based on its function, and the person skilled in the art will be able to interpret it as such. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, reference to values stated in ranges includes each and every value within that range.

Throughout this specification, words are to be afforded their normal meaning as would be understood by those skilled in the relevant art. However, so as to avoid misunderstanding, the meanings of certain terms will be specifically defined or clarified.

Figure 2:
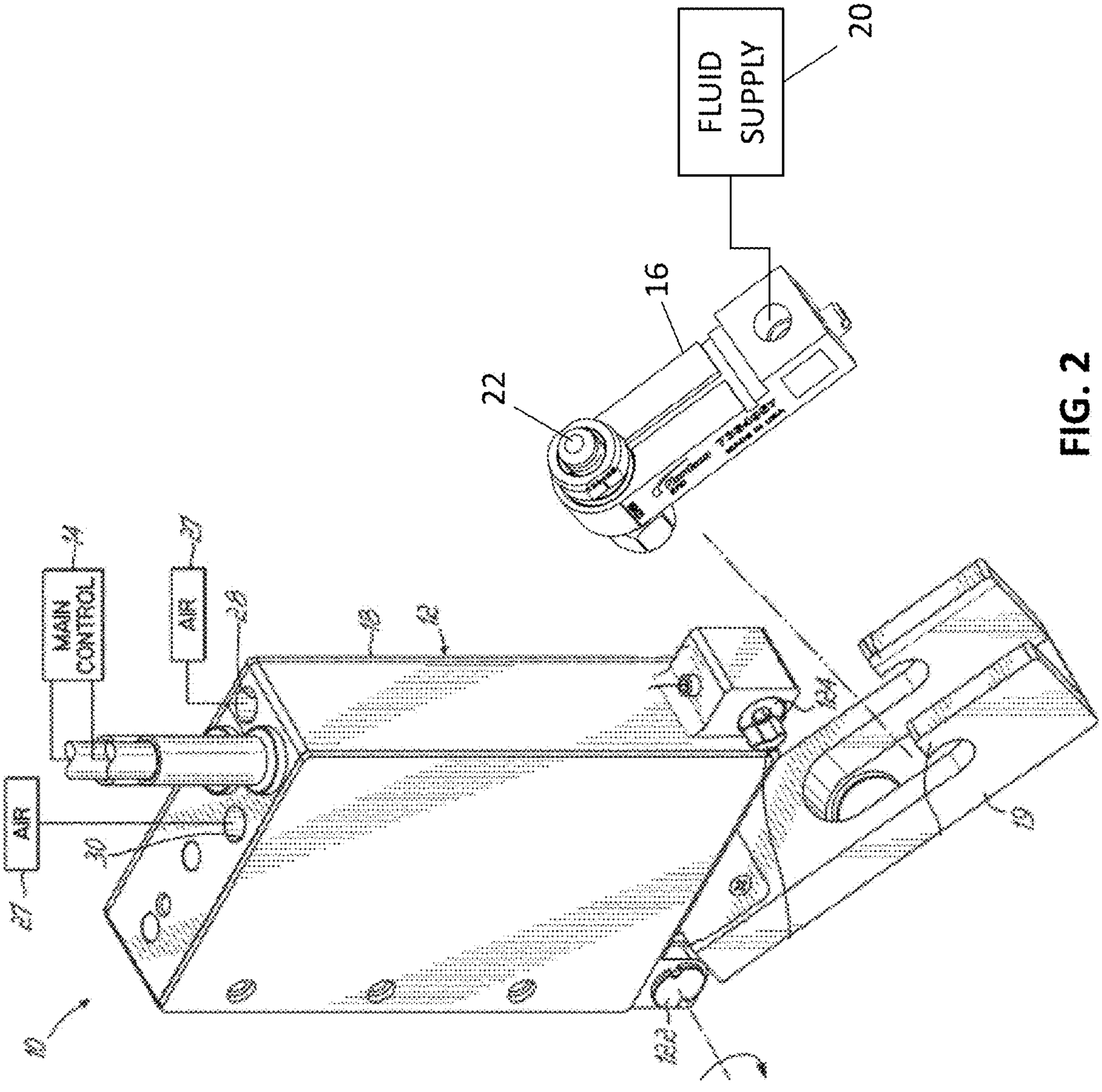
FIG. 2 illustrates another perspective view of the jetting system of FIG. 1, showing the fluid body housing in an open position according to an aspect of the disclosure.

Referring to FIGS. 1 and 2, a jetting system 10 in accordance with an aspect of the disclosure generally includes a jetting dispenser 12 coupled with a main electronic control 14. The jetting dispenser 12 includes a fluid body 16 coupled to an actuator housing 18. More specifically, the fluid body 16 is held within a fluid body housing 19, which may include one or more heaters (not shown), depending on the needs of the application. The fluid body 16 receives fluid under pressure from a suitable fluid supply 20, such as a syringe barrel (not shown). A tappet or valve assembly 22 is coupled to the actuator housing 18 and extends into the fluid body 16. For purposes of this application, a dispensing axis 1 is defined as extending parallel to a direction along which the fluid is dispensed or jetted from the jetting system 10. It will be appreciated that the jetting direction may vary depending on orientation of the jetting system 10, and the dispensing axis 1 is utilized for reference and is not intended to limit dispensing direction of any of the embodiments disclosed herein. The dispensing axis 1 may be parallel to the direction of gravity. A first axial direction 1*a* (also referred to as a dispensing direction 1*a*) may be defined parallel to the dispensing axis 1 and extend along the dispensing axis 1 in a first direction (for example, in the direction of gravity). The first axial direction 1*a* may be used to refer to the direction the dispensed or jetted fluid is configured to move away from the jetting system 10. A second axial direction 1*b* may be defined parallel to the dispensing axis 1 and in the opposite direction of the first axial direction 1*a*.

Figure 4:
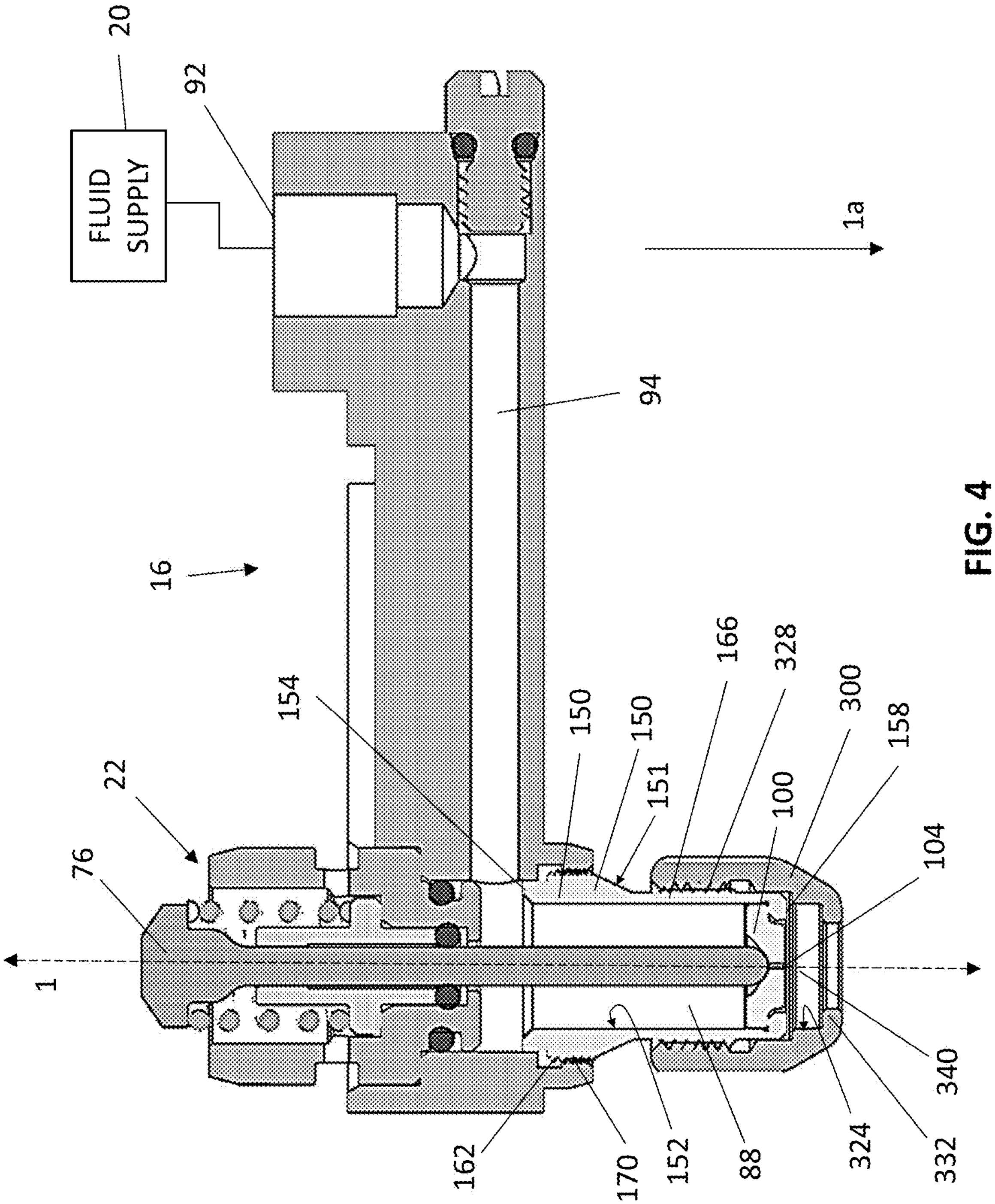
FIG. 4 illustrates a cross-sectional side view of the fluid body of FIG. 3.

The jetting dispenser 12 includes an actuator (e.g. a piezoelectric actuator) configured to operate the valve assembly 22. The actuator may be configured to cause movement of one or more components in the valve assembly 22 or in the fluid body 16 to cause, or, alternatively, to preclude, dispensing or jetting of a fluid material received into the fluid body 16. The fluid body 16 may be operatively connectable to the fluid supply 20 and may be configured to receive the fluid material into a fluid inlet 92 from the fluid supply 20 as illustrated in FIG. 4. The fluid material may be movable through the fluid body 16 along a fluid supply channel 94 and can be dispensed out of a fluid outlet 104 away from the fluid body 16. A fluid chamber 88 may be configured to receive the fluid material from the fluid supply channel 94 and may be defined, in part, by the fluid outlet 104. The fluid chamber 88 may be further defined by the valve assembly 22. A valve seat 100 may be defined on the fluid body 16 adjacent the fluid outlet 104 and may extend into the fluid chamber 88. The valve seat 100 may be selectively contacted by one or more components of the valve assembly 22 to selectively allow or preclude passage of the fluid material from within the fluid chamber 88 out through the fluid outlet 104.

The valve assembly 22 may include a valve element 76 configured for reciprocal movement within the fluid chamber 88. The valve element 76 is configured to selectively be placed into engagement, or into contact, with the valve seat 100. When the valve element 76 is engaged with the valve seat 100, the fluid material in the fluid chamber 88 is precluded from moving past the valve seat 100 and out of the fluid body 16 through the fluid outlet 104. When the valve element 76 is spaced from the valve seat 100, the fluid material may flow out of the fluid outlet 104. In some aspects, the position of valve element 76 within the fluid chamber 88 may allow or preclude fluid material to be introduced into the fluid chamber 88. In some aspects, when the valve element 76 is in a first position (for example, spaced away from the valve seat 100), fluid material is permitted to enter the fluid chamber 88 from the fluid supply channel 94 that receives the fluid material from the fluid supply 20. That is, the fluid supply channel 94 is in fluid communication with the fluid chamber 88. When the valve element 76 is in a second position spaced from the first position (for example, when the valve element 76 is in contact with the valve seat 100), the valve element 76 may block the fluid supply channel 94 to preclude the fluid material from entering the fluid chamber 88.

The actuator in the jetting dispenser 12 is configured to cause the valve element 76 to be moved along the dispensing axis 1 within the fluid chamber 88. The actuator (not shown) of the jetting dispenser 12 may be arranged such that the actuator is configured to cause movement of the valve element 76 in the first axial direction 1*a*, in the second axial direction 1*b*, or in both the first axial direction 1*a* and the second axial direction 1*b*. When the valve element 76 is moved in the first axial direction 1*a*, the valve element 76 is configured to contact the valve seat 100 defined on the fluid body 16. When the valve element 76 is in contact with the valve seat 100, fluid material within the fluid body 16 between the valve element 76 and the valve seat 100 may be precluded from being moved out of the fluid body 16. In some aspects, the movement of the valve element 76 towards the valve seat 100 may cause a portion of the fluid material to be forcefully discharged, or jetted, out of the fluid body 16. The jetting may be caused by the valve element 76 contacting and pushing the portion of the fluid material within the fluid body 16 as the valve element 76 is being moved towards the valve seat 100.

Referring to FIGS. 1 and 2, the fluid body 16 is retained in the fluid body housing 19. The fluid body housing 19 may be coupled to the actuator housing 18 by a hinge 122 at one end thereof. The fluid body housing 19 may be configured to pivotally rotate around the hinge 122 between at least two positions relative to the actuator housing 18. In a first position, the fluid body housing 19 is securely retained against the actuator housing 18, and the fluid body 16 is engaged with components within the actuator housing 18 as described above. In this position, the fluid body 16 may be configured to receive the fluid to be dispensed and to be actuated to cause dispensing of the fluid. The fluid body housing 19 may be rotated about the hinge 122 from the first position to the second position, in which the fluid body housing 19 is decoupled from the actuator housing 18, and the fluid body 16 may be spaced from the actuator housing 18. In the second position, the fluid body 16 may be accessed and may be removed from the fluid body housing 19. Removal of the fluid body 16 allows for easier cleaning and/or other maintenance or replacement of components before the fluid body 16 is re-inserted (or another fluid body 16 is inserted) within the fluid body housing 19. In this regard, the valve assembly 22 also may be easily removed from the fluid body 16 after the fluid body 16 has been removed from the fluid body housing 19. The valve assembly 22 may be replaced with one or more new parts and/or cleaned for re-use.

When the fluid body housing 19 is in the first position, the fluid body housing 19 may be releasably secured to the actuator housing 18 by a connector 124 proximate to a second end of the fluid body housing 19 opposite the first end as shown in FIG. 2. The connector 124 may include a threaded fastener, a hook-and-loop fastener, a biased push-pin fastener, a clasp, a rotatable cam, or another suitable fixing mechanism, and this disclosure is not limited to any particular fixing mechanism. When the connector 124 is in a locked configuration, the fluid body housing 19 is securely fixed to the actuator housing 18, such that the fluid body housing 19 may be precluded from being rotated about the hinge 122. When the connector 124 is in an unlocked configuration, the fluid body housing 19 may be permitted to be rotated about the hinge 122.

Figure 3:
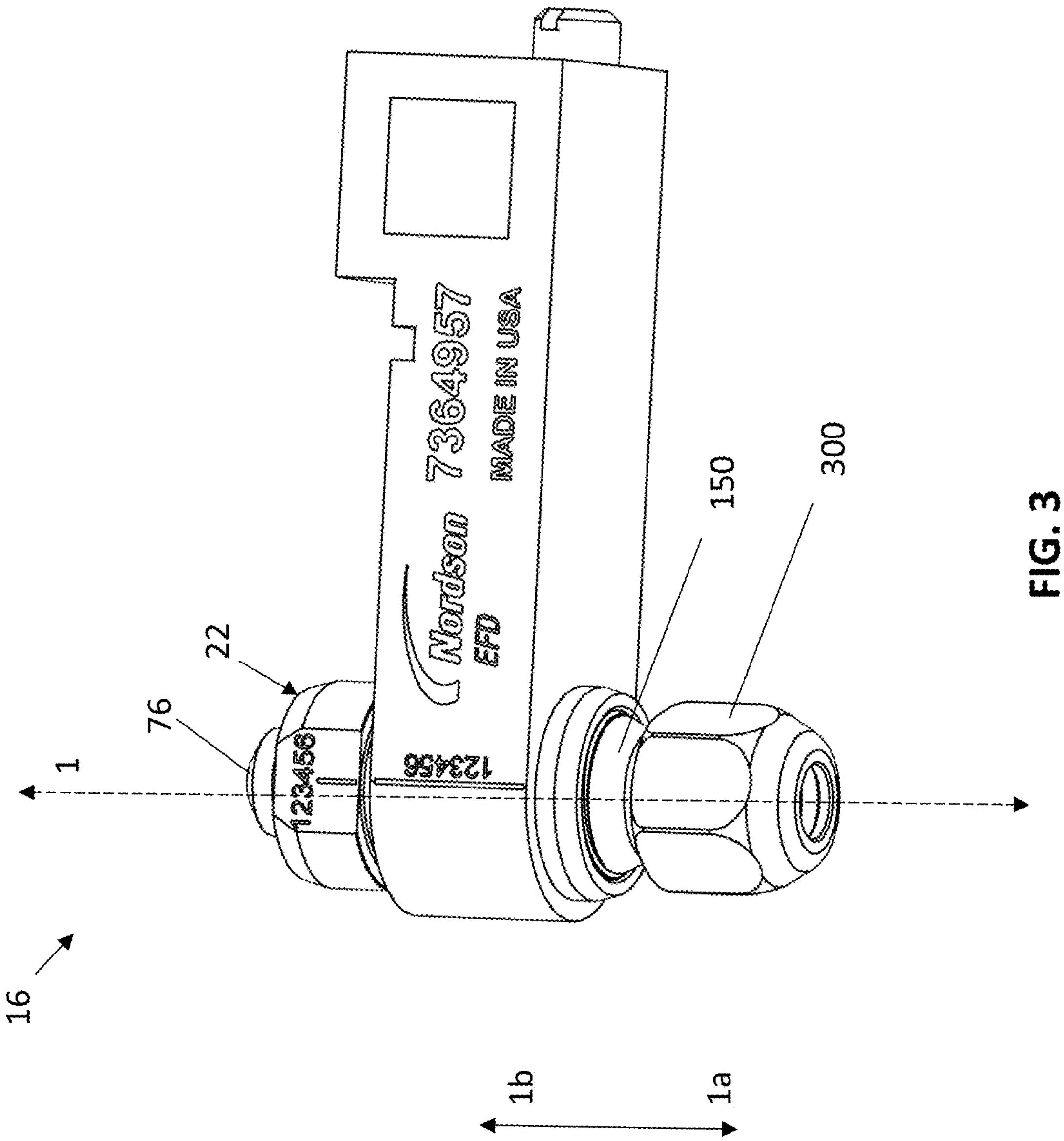
FIG. 3 illustrates a perspective view of a fluid body according to an aspect of the disclosure.

The fluid body 16 is configured to dispense or jet fluid towards a substrate (not shown). Referring to FIGS. 2-4, the fluid may be introduced into the fluid body 16 at a fluid inlet 92 from the fluid supply 20. The fluid moves, or may be moved, from the fluid inlet 92 along the fluid supply channel 94 into the fluid chamber 88. The fluid outlet 104 may be defined on the fluid body 16 and may be configured to be in fluid communication with the fluid chamber 88. The fluid outlet 104 may be defined on the valve seat 100. In some aspects, the fluid outlet 104 may be defined on a component of the fluid body 16 that may be separated from the rest of the fluid body 16, as will be described in detail below. The fluid may be dispensed or jetted out of the fluid body 16 at the fluid outlet 104. In some aspects, one or more additional components may be configured to receive the fluid from the fluid outlet 104 prior to the fluid being separated from the jetting system 10, as will be described in detail below.

The fluid outlet 104 extends from, or may be disposed adjacent to, the valve seat 100, such that when the valve element 76 is moved towards the valve seat 100, a portion of the fluid in the fluid chamber 88 may be moved towards and through the fluid outlet 104. The valve seat 100 may be disposed on a valve seat holder 150. The valve seat 100 may be a separate component from the valve seat holder 150 that may be configured to be releasably affixed to the valve seat 100. In such aspects, the valve seat 100 may be designed, structured, and/or configured to be removable and/or replaceable within the valve seat holder 150. This may allow for easier access to the valve seat 100 for cleaning a clogged valve seat 100 and fluid outlet 104, for repairing a damaged valve seat 100, replacing a worn out valve seat 100, for replacing the valve seat 100 with a different valve seat 100 having different parameters (for example, different curvature or a differently sized fluid outlet 104), and/or the like.

In some aspects, the valve seat 100 may be integrally connected with the valve seat holder 150 and be designed, structured, and/or configured to not be separately removed from the valve seat holder 150. In such aspects, the valve seat 100 may be part of a unitary valve seat holder 150 or, alternatively, may be a separate component from the valve seat holder 150 that may be securely and permanently affixed to the valve seat holder 150. When disposed in the valve seat holder 150, the valve seat 100 may be affixed to the valve seat holder 150 via any number of suitable fixating mechanisms, which may be chosen based on the intended use of the valve seat 100 and on whether the valve seat 100 is designed, structured, and/or configured to be releasably secured to the valve seat holder 150 or permanently secured. Suitable fixating mechanisms may include, but are not limited to, adhesive, welding, threading, snap fit, friction fit, etc.

The valve seat holder 150 may be affixed to the fluid body 16 and may be either part of a unitary fluid body 16 or, alternatively, may be a separate component that is configured to releasably attach to the fluid body 16. Referring to FIGS. 4-7, the valve seat holder 150 may have a proximal end 154 and a distal end 158 spaced from the proximal end 154 along the dispensing axis 1 (for example, in the dispensing direction **1*a* or in the direction of the fluid outlet 104). The fluid chamber 88 may be defined by an inner surface 152 of the valve seat holder 150 between the proximal end 154 and the distal end 158. The valve element 76 may be receivable into the valve seat holder 150 (and into the fluid chamber 88) through a proximal opening 156 (shown in FIG. 7) defined at the proximal end 154 of the valve seat holder 150. The valve seat 100 and/or the fluid outlet 104 may be disposed adjacent the distal end 158, and the fluid may be discharged or jetted from inside the fluid chamber 88 out of the valve seat holder 150 through the fluid outlet 104 at the distal end 158**.

Figure 6:
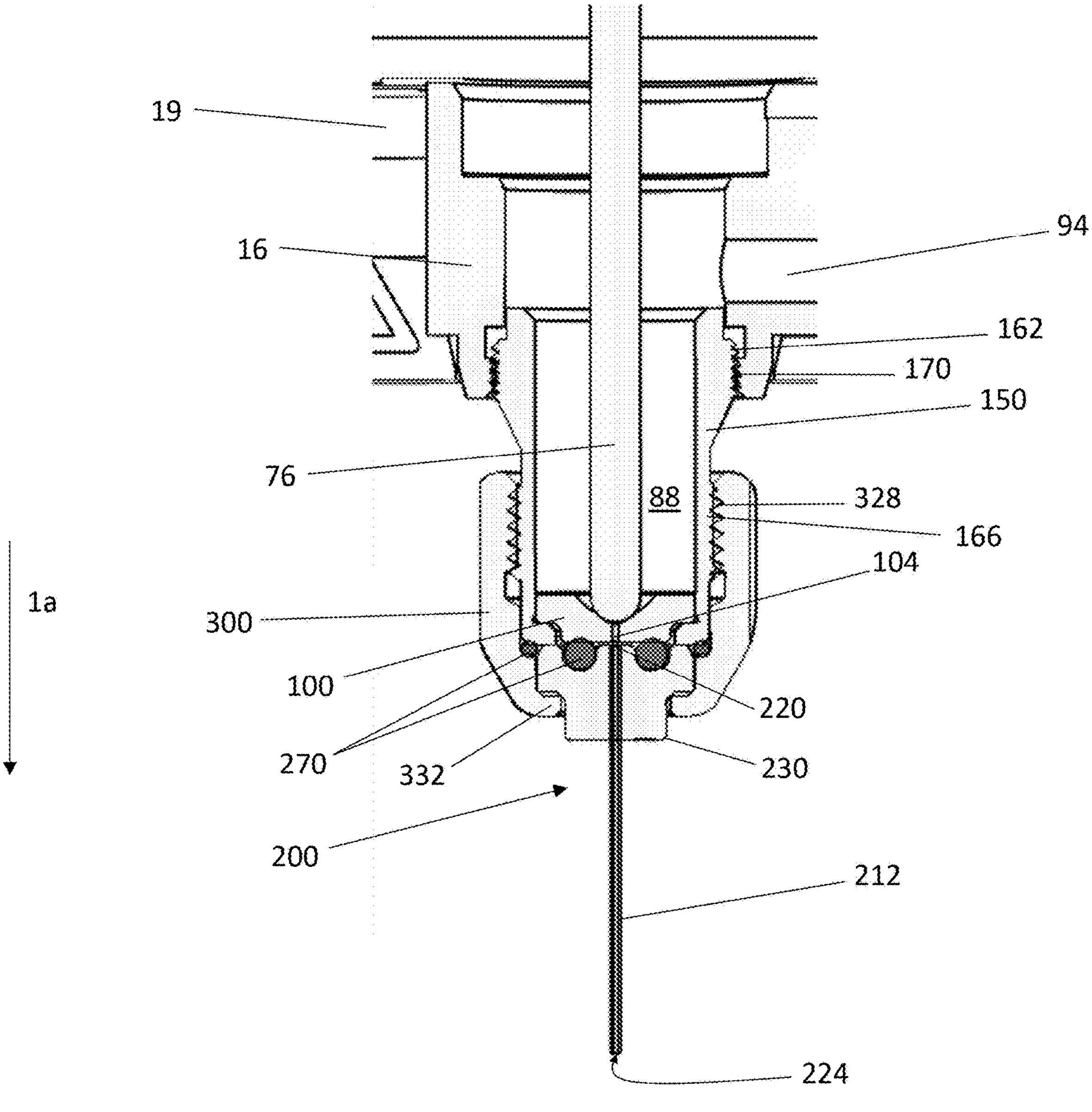
FIG. 6 illustrates a side cross-sectional view of a fluid body with a dispensing needle according to an aspect of the disclosure.

In some aspects, the valve seat holder 150 may be configured to be releasably secured to the fluid body 16, such that the valve seat holder 150 may be separated from and removed from the fluid body 16. The valve seat holder 150 may be secured to the rest of the fluid body 16 via a suitable fixating mechanism, such as threading, snap fit, and/or another mechanism. As shown in FIGS. 4 and 6, for example, the valve seat holder 150 may include threads 162 defined on an outer surface 151. The threads 162 may be configured to releasably engage with a complementary threads 170 defined on a portion of the fluid body 16 that receives the valve seat holder 150. The valve seat holder 150 may be designed, structured, and/or configured to be detachable and removable from the rest of the fluid body 16. This would allow for the valve seat holder 150 to be cleaned or repaired without having to disassemble the entire jetting system 10. The valve seat holder 150 being removable may also provide easier access to the valve seat 100 therein for cleaning, repair, and/or replacement as described above. In some aspects, where a valve seat 100 is deemed to need replacement, the valve seat 100 may be removed from and replaced within the valve seat holder 150, or, alternatively, the entire valve seat holder 150 may be removed from the fluid body 16 along with the valve seat 100 therein and replaced with a different valve seat holder 150 having a different valve seat 100 therein. Allowing for various components of the jetting system 10 to be removed, cleaned, and/or replaced without having to disassemble the entire jetting system 10 increases efficiency, decreases time spent on maintenance, and reduces waste that often accompanies replacement of groups of inseparable components where only some of the components may need replacing.

Figure 7:
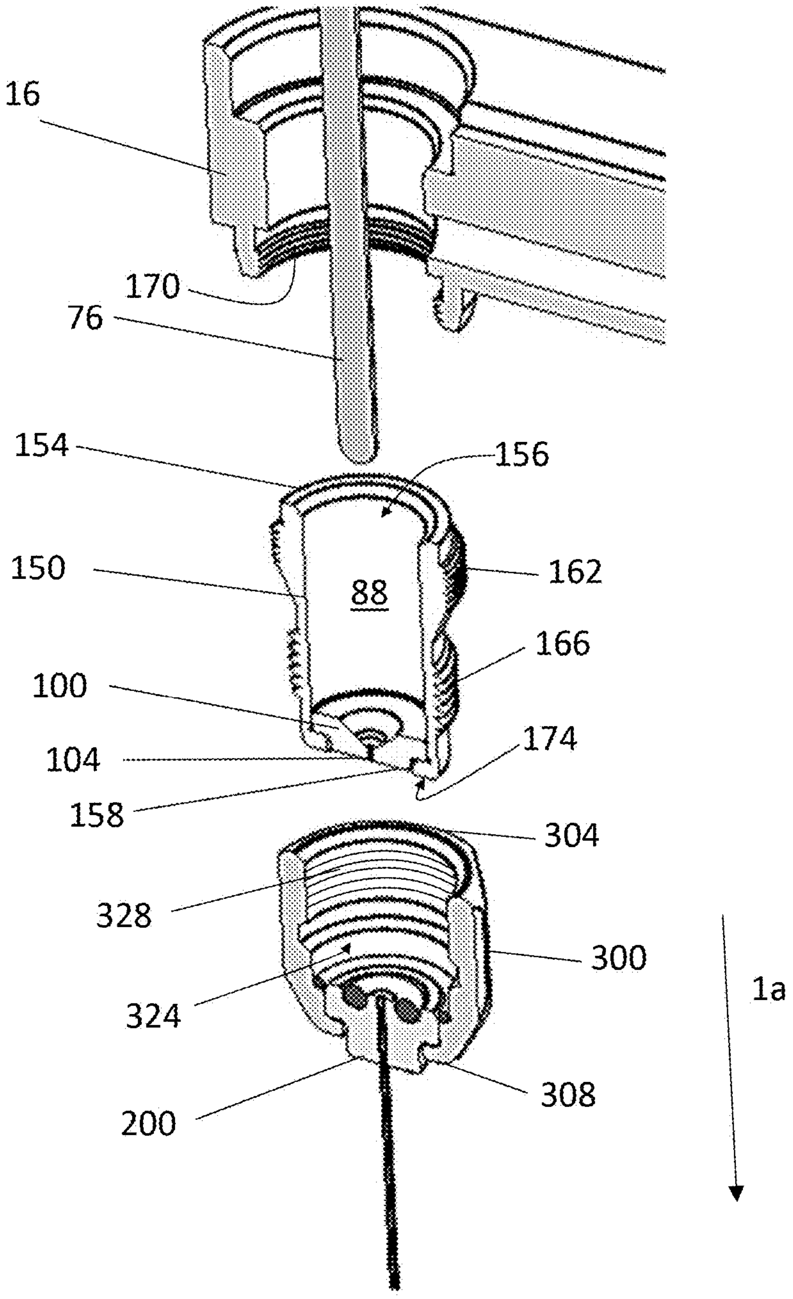
FIG. 7 illustrates a partially exploded cross-sectional side view of the fluid body of FIG. 6.

As noted above, the fluid being discharged from the fluid body 16 may be discharged or jetted into or onto another component prior to being moved to the substrate. Additional components may include funnels, needles, sprayers, other conduits, dispensers, applicators, receptacles, and/or the like configured to receive the dispensed fluid prior to the fluid being moved to the substrate. Referring to FIGS. 6 and 7, a needle 200 may be configured to receive the discharged fluid from the fluid chamber 88. The needle 200 may be disposed adjacent the fluid outlet 104, such that the needle 200 may be configured to receive the fluid being discharged from the fluid outlet 104.

Figure 9:
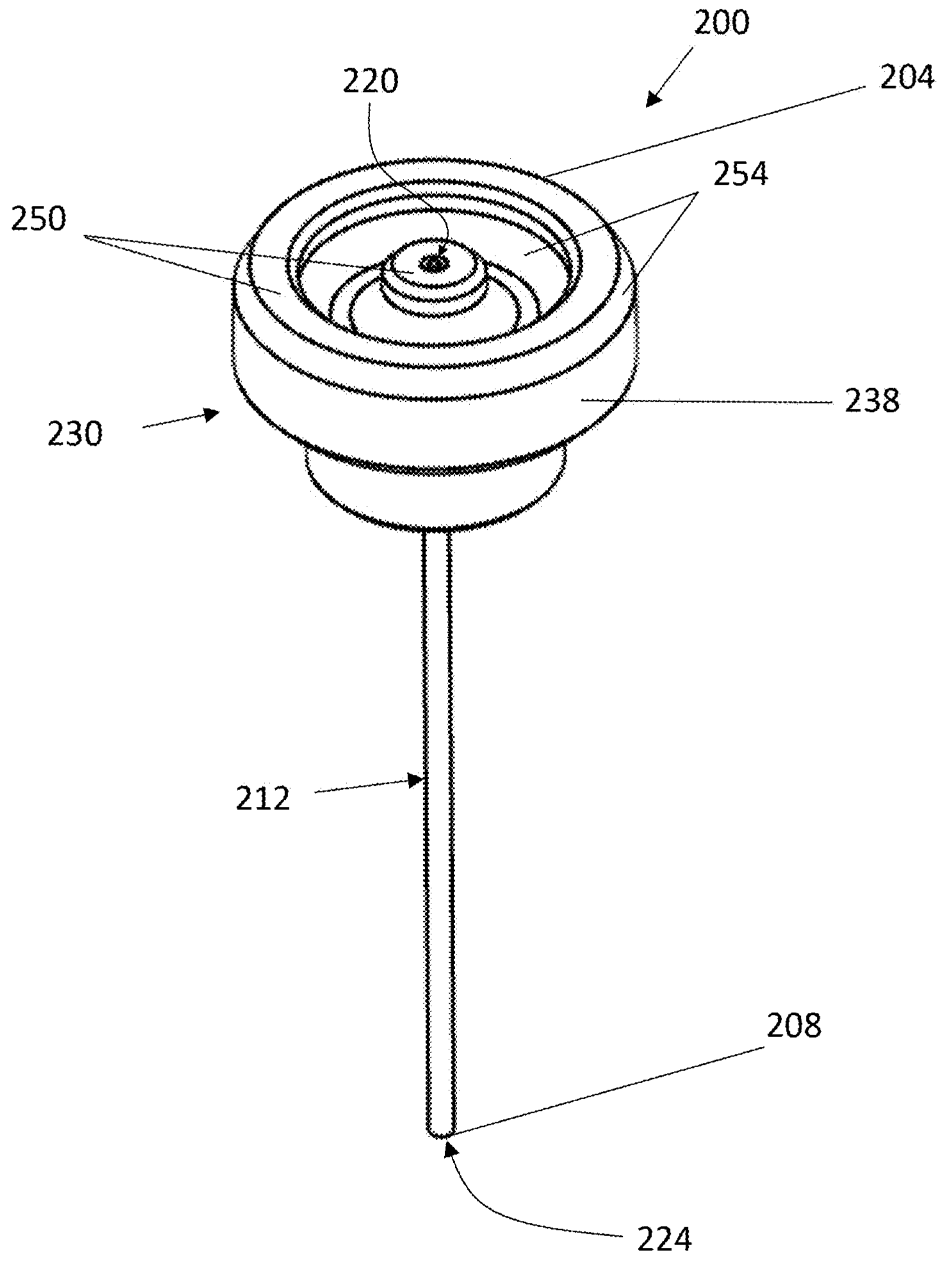
FIG. 9 illustrates a perspective view of a dispensing needle according to an aspect of the disclosure.
Figure 10:
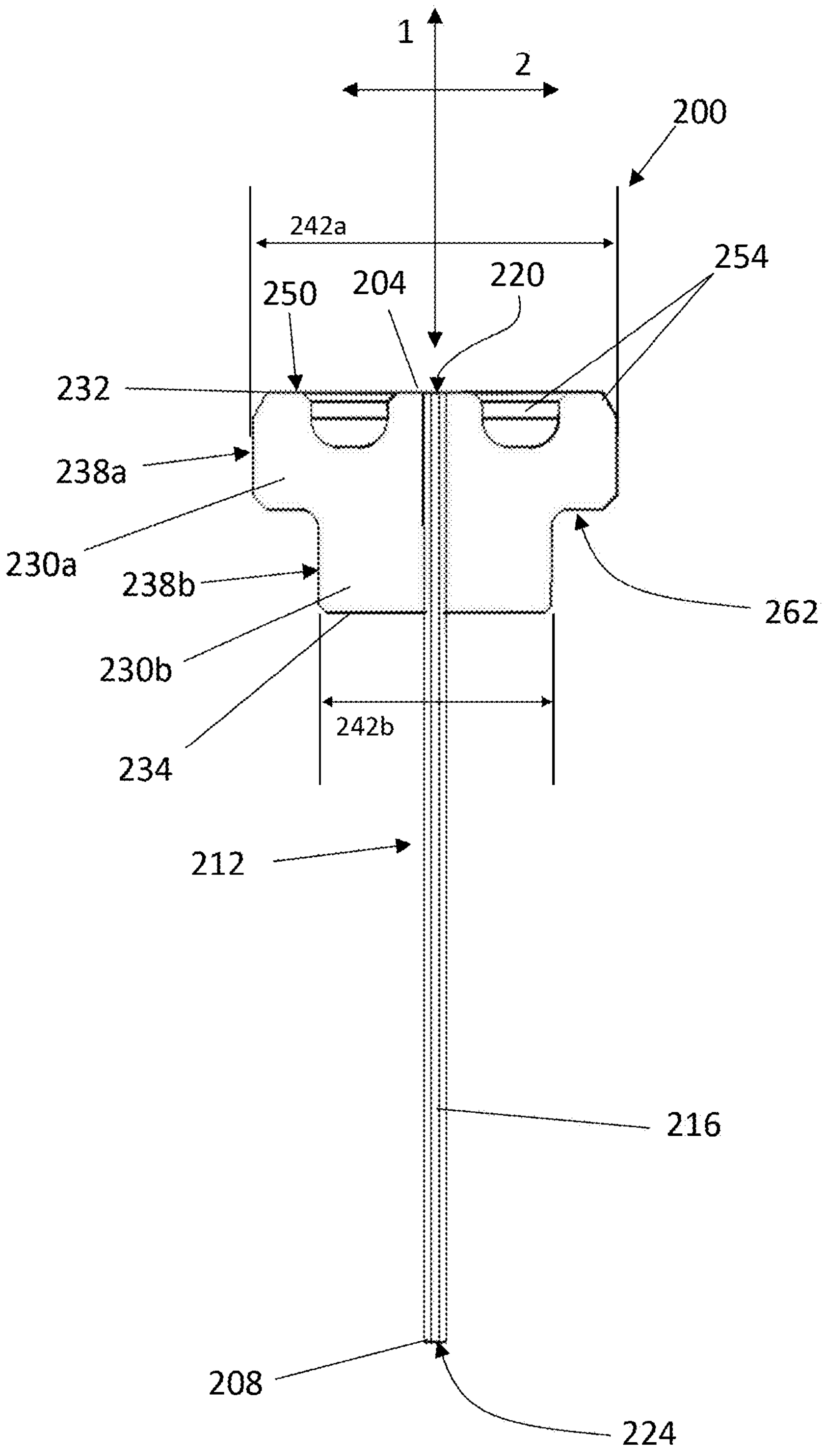
FIG. 10 illustrates a side cross-sectional view of the dispensing needle of FIG. 9.
Figure 11:
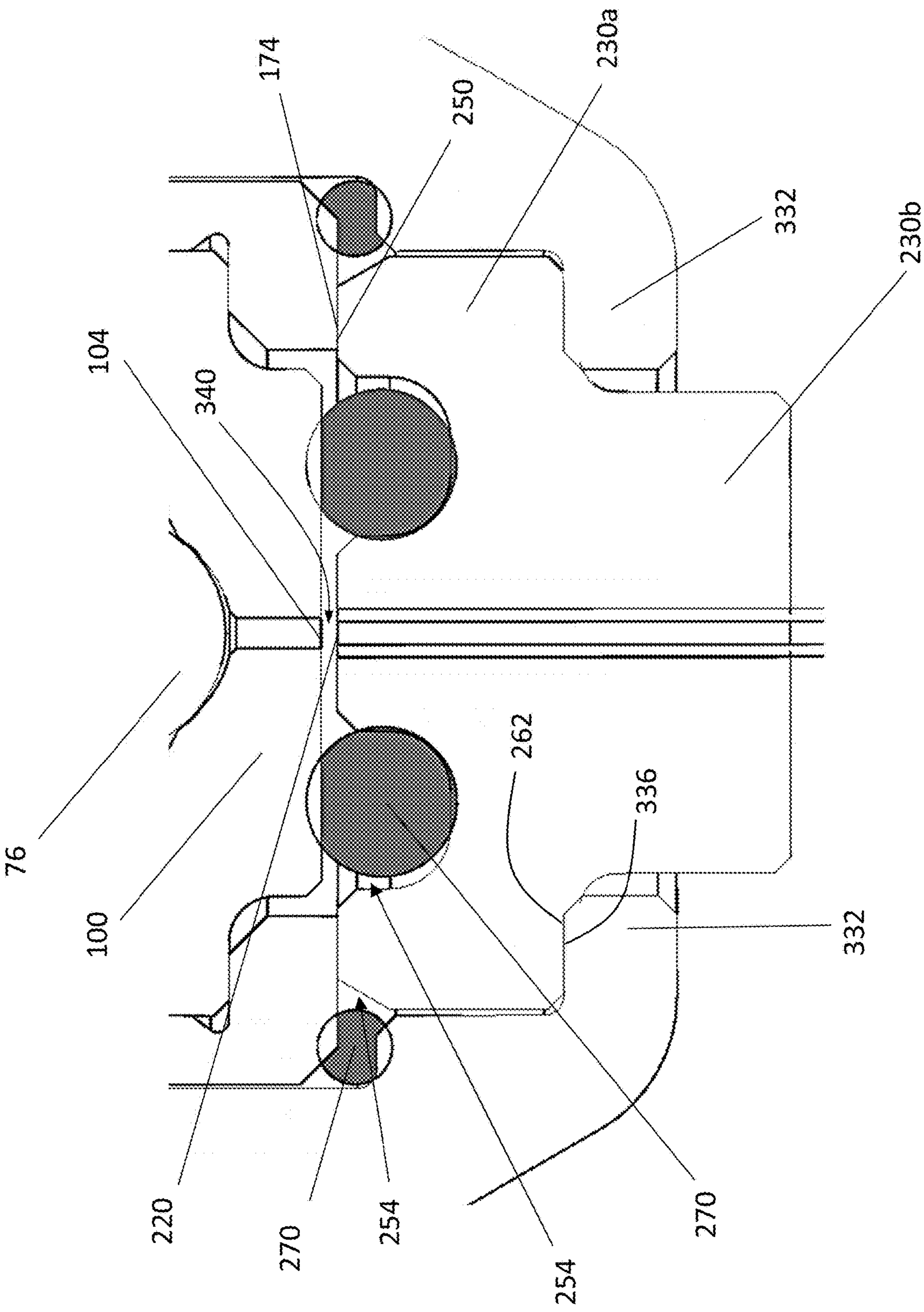
FIG. 11 illustrates a side cross-sectional view of a portion of a fluid body with a dispensing needle according to an aspect of the disclosure.

With continued reference to FIGS. 6 and 7 and with further reference to FIGS. 9-11, the needle 200 may include a proximal end 204 and a distal end 208 spaced from the proximal end 204 along an axial direction along the dispensing axis 1, for example in the first axial (or dispensing direction) **1*a*. A needle shaft 212 may extend between the proximal end 204 and the distal end 208. The needle shaft 212 may define a lumen 216 extending therethrough. A needle inlet 220 may be defined at the proximal end 204 of the needle shaft 212, and a needle outlet 224 may be defined at the distal end 208. The lumen 216 may be in fluid communication with both the needle inlet 220 and the needle outlet 224. The needle 200 may be configured to receive the fluid dispensed out of the fluid outlet 104 into the lumen 216 through the needle inlet 220. The fluid may travel through the lumen 216 towards the distal end 208 and may be discharged out of the needle 200 from the lumen 216 through the needle outlet 224. In some aspects, the needle shaft 212 may be substantially cylindrical, but it will be appreciated that the needle shaft 212 (and the lumen 216**) may be designed, structured, and/or configured to have a different cross-sectional shape, such as rectangular, triangular, oblong, trapezoidal, and/or another suitable shape.

The needle 200 may further include an outer housing or needle housing 230 configured to receive and secure the needle shaft 212 therein. The needle housing 230 may be configured to engage with other components of the jetting system 10, for example with the fluid body 16 or the valve seat holder 150. In such aspects, the needle shaft 212 is not directly connected to the jetting system 10 and is, instead, secured relative to the jetting system 10 via the needle housing 230. The needle housing 230 may be dimensioned such that, when the needle 200 is engaged with the jetting system 10, the needle shaft 212 and the lumen 216 may be oriented and aligned in a desired manner such that the fluid dispensed from the fluid chamber 88 may be receivable into the lumen 216. The needle 200 may be secured to the fluid body 16, or to a related component of the fluid body 16 (e.g. the valve seat holder 150), via the needle housing 230.

The needle housing 230 may be substantially cylindrical, but it will be appreciated that other shapes can be utilized.

As shown in the exemplary depiction of FIG. 10, the needle housing 230 may include a proximal end 232 and a distal end 234 spaced from the proximal end 232 along the dispensing direction 1*a*. The proximal end 232 of the needle housing 230 may axially overlap with the proximal end 204 of the needle 200. The distal end 234 may be axially spaced from the distal end 208 of the needle 200, such that the distal end 234 of the needle housing 230 may be axially disposed between the proximal end 204 and the distal end 208 of the needle 200. In some aspects, the proximal end 232 may be axially spaced from the proximal end 204 of the needle 200, such that the proximal end 232 of the housing is disposed axially between the proximal end 204 and the distal end 208 of the needle.

As shown in FIG. 9, the needle housing 230 may define an outer surface 238 extending along the dispensing axis 1. In some aspects, the needle housing 230 may be substantially uniformly sized throughout, such that the needle housing 230 defines the same diameter along the entirety thereof. Referring to the exemplary aspect shown in FIG. 10, in some aspects, the needle housing 230 may include a proximal portion 230*a* and a distal portion 230*b* extending from the proximal portion 230*a* axially along the dispensing direction 1*a*. The proximal portion 230*a* may be adjacent the proximal end 232 of the needle housing 230, while the distal portion 230*b* may be adjacent the distal end 234 of the needle housing 230. The proximal portion 230*a* and the distal portion 230*b* may have different physical dimensions, such as diameters. In some aspects, the proximal portion 230*a* may have a first diameter 242*a* that is greater than a second diameter 242*b* of the distal portion 230*b*. Each of the proximal portion 230*a* and the distal portion 230*b* define an outer surface extending between the proximal end 232 and the distal end 234. In some aspects, the proximal portion 230*a* defines an outer surface 238*a*, and the distal portion 230*b* defines an outer surface 238*b*. The outer surface 238*a* of the proximal portion 230*a* may be axially adjacent to the outer surface 238*b* of the distal portion 230*b* along the dispensing axis 1.

With continued reference to FIGS. 9-11, the needle housing 230 includes a top contact surface 250 configured to be placed in contact with a component of the fluid body 16, for example the valve seat holder 150. The top contact surface 250 may be defined on the proximal portion 230*a* at the proximal end 232 of the needle housing 230. A bottom contact surface 262 may be defined opposite the top contact surface 250 and spaced along the first axial direction 1*a* from the top contact surface 250. The bottom contact surface 262 may be disposed on the proximal portion 230*a* of the needle housing 230, such that the proximal portion 230*a* is arranged between the top contact surface 250 and the bottom contact surface 262. In some aspects, such as shown in FIG. 10, the bottom contact surface 262 may be disposed between the outer surface 238*a* of the proximal portion 230*a* and the outer surface 238*b* of the distal portion 230*b* along a radial direction 2 perpendicular to the dispensing axis 1. The top contact surface 250 and the bottom contact surface 262 may be planar and parallel to each other in some aspects, although other relative orientations are envisioned. The top contact surface 250 may be adjacent to the proximal end 204 of the needle 200 and to the needle inlet 220.

In some aspects, as shown in FIGS. 9 and 10, the top contact surface 250 may further define one or more notches, slots, grooves, and/or the like that may be configured to receive one or more sealing elements. For example, a notch 254 may be defined on the top contact surface 250 configured to receive a seal 270 (shown in see, e.g. FIGS. 6-8). The seal 270 may be elastomeric. In some aspects, the seal 270 may be an O-ring. When the needle 200 is engaged with the fluid body 16, the seal 270 may be configured to provide a liquid-tight seal such that liquid cannot move past the seal 270. In some aspects, the needle 200 may include a plurality of seals 270 spaced from each other in the radial direction 2. For example, the needle 200 may include two seals 270 (such as O-rings) that are spaced concentrically relative to each other along the top contact surface 250. The plurality of seals 270 may be redundant to ensure that if one of the seals 270 is damaged, another seal 270 can prevent leakage. In some aspects, the one or more seals 270 may be configured to prevent any of the fluid that is being dispensed from entering the various threads disposed on the valve seat holder 150, on a retaining nut 300 (described below), and/or elsewhere on the fluid body 16. The one or more seals 270 may be configured to define a space 340 between the needle 200 and the valve seat 100 into which the dispensed material may be received, as will be described further below.

Figure 20:
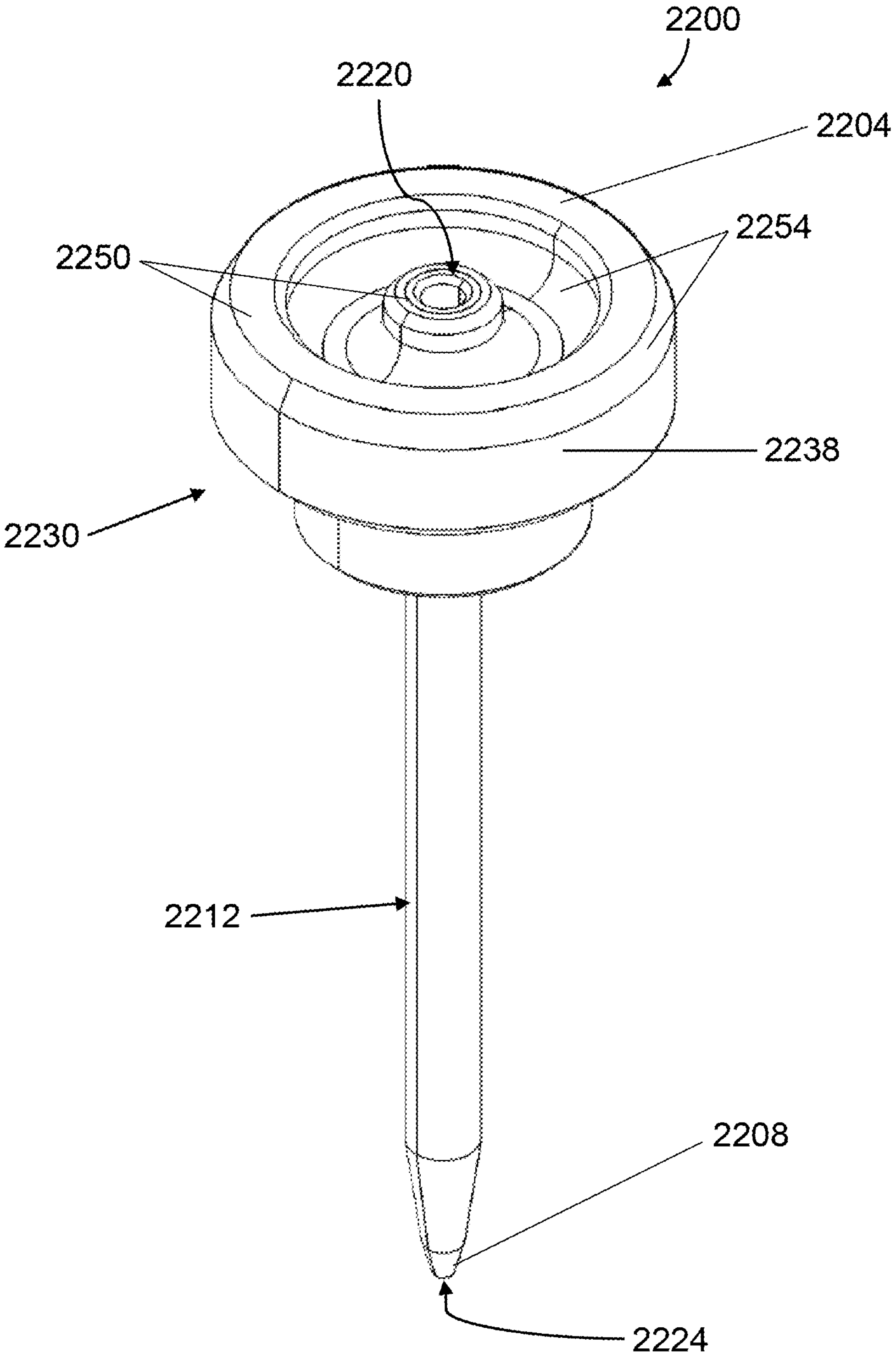
FIG. 20 illustrates a perspective view of another dispensing needle according to an aspect of the disclosure.
Figure 21:
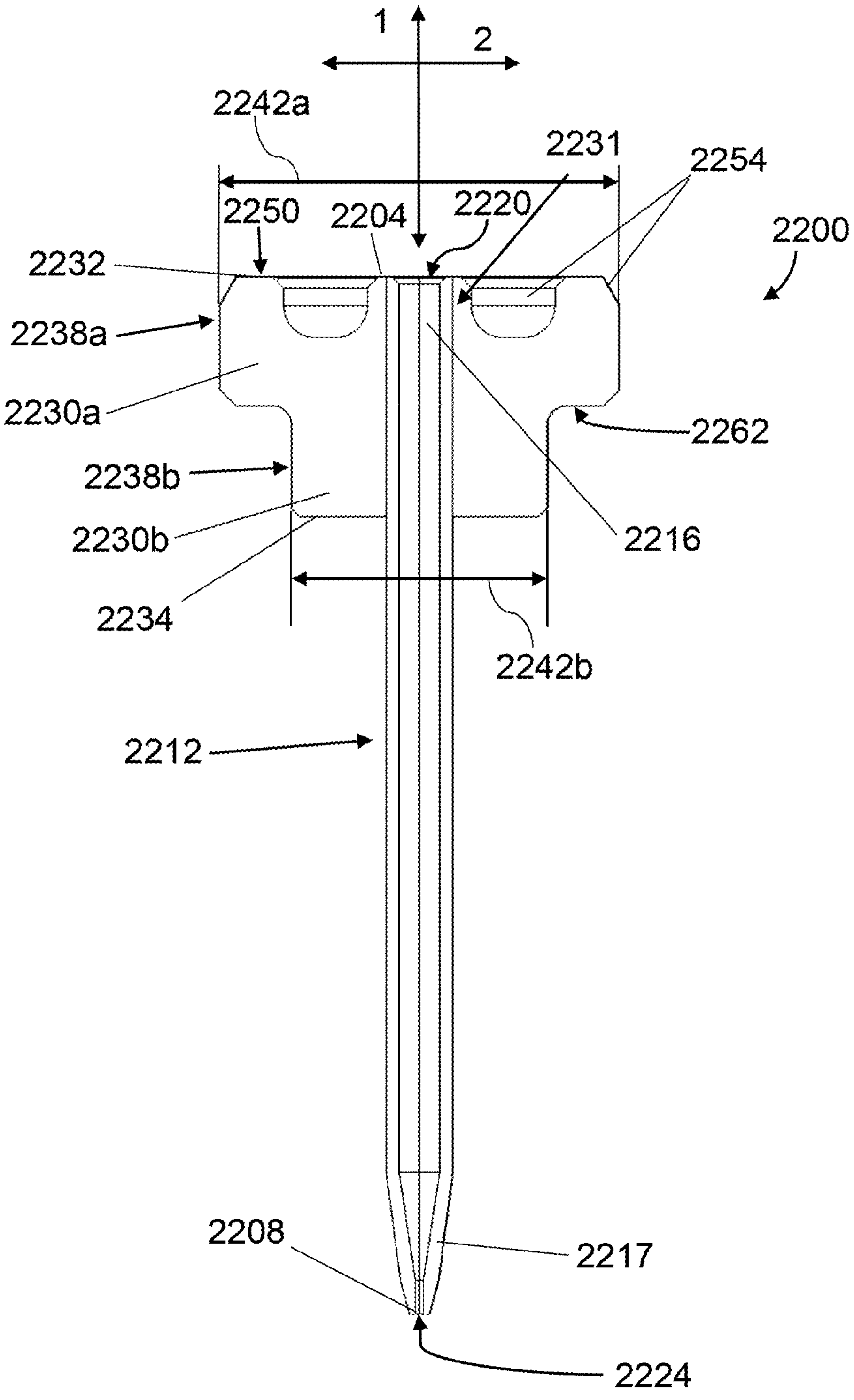
FIG. 21 illustrates a side cross-sectional view of the dispensing needle of FIG. 20.

Referring to FIGS. 20 and 21, another needle 2200 may be configured to receive the discharge fluid from the fluid chamber 88 in any or all of the same manners described herein with respect to the needle 200. That is, the needle 2200 may include any or all of the features of the needle 200, but may differ in some respects (e.g., may be wider) as described herein. The needle 2200 may engage with and/or function together with the jetting system 10 in any or all of the manners described herein with respect to the needle 200.

The needle 2200 may include a proximal end 2204 and a distal end 2208 spaced from the proximal end 2204 along an axial direction along the dispensing axis 1, for example in the first axial (or dispensing direction) 1*a*. The needle 2200 may include a needle shaft 2212 that may extend between the proximal end 2204 and the distal end 2208. The needle shaft 2212 may define a lumen 2216 extending therethrough. A needle inlet 2220 may be defined at the proximal end 2204 of the needle shaft 2212, and a needle outlet 2224 may be defined at the distal end 2208. The lumen 2216 may be in fluid communication with both the needle inlet 2220 and the needle outlet 2224. The needle 2200 may be configured to receive the fluid dispensed out of the fluid outlet 104 (illustrated in FIGS. 5, 6, 7, and 11) into the lumen 2216 through the needle inlet 2220. The fluid may travel through the lumen 2216 towards the distal end 2208 and may be discharged out of the needle 2200 from the lumen 2216 through the needle outlet 2224. In some aspects, the needle shaft 2212 (and the lumen 2216) may be substantially cylindrical. The needle 2200 may differ from the needle 200 in that the needle shaft 2212 (and lumen 2216) may be wider and may include a taper 2217 (e.g., may be swaged and ground) at the distal end 2208 towards the needle outlet 2224. But it will be appreciated that the needle shaft 2212 (and the lumen 2216) may be designed, structured, and/or configured to have a different cross-sectional shape, such as rectangular, triangular, oblong, trapezoidal, and/or another suitable shape.

The needle 2200 may further include an outer housing or a needle housing 2230 configured to receive and secure the needle shaft 2212 therein. The needle housing 2230 may be configured to engage with other components of the jetting system 10, for example with the fluid body 16 or the valve seat holder 150 in any of the same manners described herein with respect to the needle 200. In such aspects, the needle shaft 2212 is not directly connected to the jetting system 10 and is, instead, secured relative to the jetting system 10 via the needle housing 2230. The needle housing 2230 may be dimensioned such that, when the needle 2200 is engaged with the jetting system 10, the needle shaft 2212 and the lumen 2216 may be oriented and aligned in a desired manner such that the fluid dispensed from the fluid chamber 88 (illustrated in FIGS. 4, 5, 6, and 7) may be receivable into the lumen 2216. The needle 2200 may be secured to the fluid body 16, or to a related component of the fluid body 16 (e.g. the valve seat holder 150), via the needle housing 2230.

The needle housing 2230 may be substantially cylindrical, but it will be appreciated that other shapes can be utilized. As shown in FIG. 21, the needle housing 2230 may include a proximal end 2232 and a distal end 2234 spaced from the proximal end 2232 along the dispensing direction 1. The proximal end 2232 of the needle housing 2230 may axially overlap with the proximal end 2204 of the needle 2200. The distal end 2234 may be axially spaced from the distal end 2208 of the needle 2200, such that the distal end 2234 of the needle housing 2230 may be axially disposed between the proximal end 2204 and the distal end 2208 of the needle 2200. In some aspects, the proximal end 2232 may be axially spaced from the proximal end 2204 of the needle 2200, such that the proximal end 2232 of the housing is disposed axially between the proximal end 2204 and the distal end 2208 of the needle.

As shown in FIG. 20, the needle housing 2230 may define an outer surface 2238 extending along the dispensing axis 1. In some aspects, the needle housing 2230 may be substantially uniformly sized throughout, such that the needle housing 2230 defines the same diameter along the entirety thereof. Referring to FIG. 21, in some aspects, the needle housing 2230 may include a proximal portion **2230*a* and a distal portion 2230*b* extending from the proximal portion 2230*a* axially along the dispensing direction 1. The proximal portion 2230*a* may be adjacent the proximal end 2232 of the needle housing 2230, while the distal portion 2230*b* may be adjacent the distal end 2234 of the needle housing 2230. The proximal portion 2230*a* and the distal portion 2230*b* may have different physical dimensions, such as diameters. In some aspects, the proximal portion 2230*a* may have a first diameter 2242*a* that is greater than a second diameter 2242*b* of the distal portion 230*b*. Each of the proximal portion 2230*a* and the distal portion 2230*b* may define an outer surface extending between the proximal end 2232 and the distal end 2234. In some aspects, the proximal portion 2230*a* defines an outer surface 2238*a*, and the distal portion 2230*b* defines an outer surface 2238*b*. The outer surface 2238*a* of the proximal portion 2230*a* may be axially adjacent to the outer surface 2238*b* of the distal portion 2230*b* along the dispensing axis 1**.

The needle housing 2230 may include a top contact surface 2250 configured to be placed in contact with a component of the fluid body 16, for example the valve seat holder 150. The top contact surface 2250 may be defined on the proximal portion **2230*a* at the proximal end 2232 of the needle housing 2230. A bottom contact surface 2262 may be defined opposite the top contact surface 2250 and spaced along the first axial direction 1 from the top contact surface 2250. The bottom contact surface 2262 may be disposed on the proximal portion 2230*a* of the needle housing 2230, such that the proximal portion 2230*a* is arranged between the top contact surface 2250 and the bottom contact surface 2262. In some aspects, such as shown in FIG. 21, the bottom contact surface 2262 may be disposed between the outer surface 2238*a* of the proximal portion 2230*a* and the outer surface 2238*b* of the distal portion 2230*b* along a radial direction 2 perpendicular to the dispensing axis 1. The top contact surface 2250 and the bottom contact surface 2262 may be planar and parallel to each other in some aspects, although other relative orientations are envisioned. The top contact surface 2250 may be adjacent to the proximal end 2204 of the needle 2200 and to the needle inlet 2220**.

In some aspects, as shown in FIGS. 20 and 21, the top contact surface 2250 may further define one or more notches, slots, grooves, and/or the like that may be configured to receive one or more sealing elements. For example, a notch 2254 may be defined on the top contact surface 2250 configured to receive the seal 270 in a similar manner as the needle 200, described previously. The notch 2254 may partially or completely surround a region 2231 of the needle housing 2230 that includes the needle inlet 2220 and the lumen 2216. The needle inlet 2220 and the lumen 2216 may be wide or wider and the lumen may remain wide or wider between the needle inlet 2220 and the taper 2217. For example, the needle inlet 2220 and the lumen 2216 may occupy a substantial portion and/or a majority of the region 2231. In embodiments, the needle inlet 2220 and the lumen 2216 may occupy between 50-60%, 60-70%, 70-80%, or 80-90% of the region 2231. Providing a wide or wider implementation of the needle inlet 2220 and a wide or wider implementation of the lumen 2216 up to the taper 2217 can advantageously allow accurate and precise dispensing of thick fluids. Again, it is to be understood that any subsequent description of relationships between the needle 200 and any other aspects of the jetting system 10 may also apply in the same manner to the needle 2200.

The needle 200 may be releasably engaged with the fluid body 16 and may be separated from the fluid body 16. Removal of the needle 200 from the fluid body 16 allows for cleaning of components of the fluid body 16 and/or cleaning of the needle 200. Removability of the needle 200 also allows for the needle 200 to be replaced with another needle 200. As such, the fluid body 16 may be configured to be operable with a variety of needles 200, for example, having different dimensions of the lumen 216. In some aspects, if a needle 200 becomes clogged or damaged, the needle 200 may be disengaged from the fluid body 16 and removed from the jetting system 10 so that another needle 200 may be introduced in its place and engaged with the fluid body 16.

In some aspects, as shown in FIG. 6, the needle 200 may be held in engagement with the rest of the fluid body 16, for example, engaged with or adjacent to the valve seat holder 150, by a movable retaining component. The retaining component may be configured to hold the needle 200 in compression against one or more components of the fluid body 16. In some aspects, the retaining component may be a retaining nut 300. Referring generally to FIGS. 4-8, the retaining nut 300 may include a proximal end 304 and a distal end 308 spaced from the proximal end 304 in an axial direction, for example along the dispensing axis 1 in the dispensing direction **1*a*. The retaining nut 300 may include an inner surface 324 that defines a receptacle 312 extending through the retaining nut 300. The receptacle 312 is configured to receive the needle 200 therein. A proximal opening 316 is defined at the proximal end 304 and is in fluid communication with the receptacle 312. A distal opening 320 is defined at the distal end 308 and is in fluid communication with the receptacle 312. At least a portion of the needle 200 may be configured to be movable along the dispensing direction 1*a* within the receptacle 312**.

The retaining nut 300 may be releasably attachable to the fluid body 16. In some aspects, the retaining nut 300 may be affixed to the valve seat holder 150. The retaining nut 300 may be affixed to the valve seat holder 150 via threads, snap fit, friction fit, joint fit, and/or another suitable connection method. the exemplary embodiment depicted in FIG. 7, the inner surface 324 of the retaining nut 300 may define threads 328 thereon that are configured to releasably engage with complementary threads 166 defined on the outer surface 151 of the valve seat holder 150. Although the figures depict the threads 328 on the inner surface 324 and complementary threads 166 on the outer surface 151, it will be appreciated that this arrangement may be reversed, such that the threads 328 of the retaining nut 300 are defined on an outer surface thereof, while complementary threads 166 are defined on the inner surface 152 of the valve seat holder 150 or on another component of the fluid body 16.

The retaining nut 300 may serve as a carrier for the needle 200 and as the attachment interface between the needle 200 and the fluid body 16. That is, engagement between the needle 200 and the fluid body 16 (e.g. with the valve seat holder 150) may be dependent on the alignment, orientation, relative position to, and relative engagement with the fluid body 16. The retaining nut 300 may include particular dimensions and components therein or thereon configured to secure the needle 200 therein and to carry and engage the needle 200 to the fluid body 16, as will be described in detail below.

Figure 8:
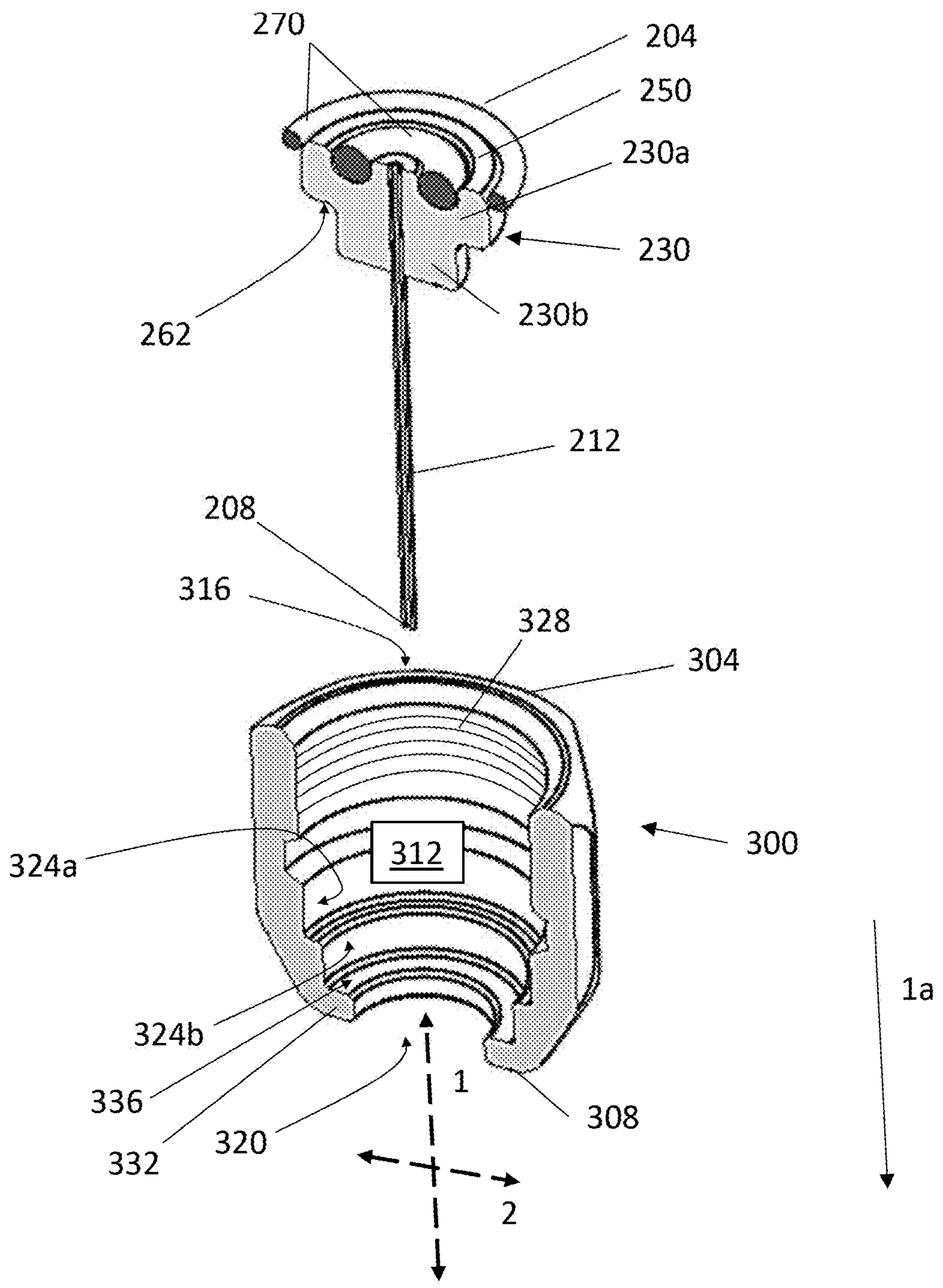
FIG. 8 illustrates an exploded cross-sectional view of a portion of the fluid body of FIG. 7.

Referring to FIGS. 7 and 8, the receptacle 312 and the inner surface 324 of the retaining nut 300 may be dimensioned such that they complement the shape of at least a portion of the needle 200, for example, the needle housing 230. It may be advantageous for the retaining nut 300 to receive the needle 200 therein so that, when the needle 200 is in contact with the retaining nut 300, the needle 200 may be precluded from translational movement relative to the retaining nut 300 in a plane perpendicular to the dispensing direction 1*a* (for example, in the radial direction 2). In aspects where the needle housing 230 includes a proximal portion 230*a* and a differently dimensioned distal portion 230*b*, as described above, the retaining nut 300 may include complementarily dimensioned surfaces to receive the needle housing 230 and the respective proximal portion 230*a* and distal portion 230*b* to preclude undesired movement. As shown in FIG. 8, the inner surface 324 of the retaining nut 300 may include a first portion 324*a* and a second portion 324*b* adjacent the first portion 324*a*. The needle 200 may be moved into a seated configuration within the retaining nut 300 such that the needle 200 is fixedly secured relative to the nut in at least the dispensing direction 1*a* (see FIG. 6). When the needle 200 is moved into the receptacle 312 and into the seated configuration, the proximal portion 230*a* of the needle housing 230 of the needle 200 may be placed adjacent to, or in contact with, the first portion 324*a* of the inner surface 324 of the retaining nut 300. The distal portion 230*b* may be placed adjacent to, or in contact with, the second portion 324*b*. The outer surface 238*a* of the proximal portion 230*a* may be adjacent to, or in contact with, the first portion 324*a*, while the outer surface 238*b* of the distal portion 230*b* may be adjacent to, or in contact with, the second portion 324*b*. When the needle 200 is in the seated configuration, the contact between the inner surface 324 of the retaining nut 300 and the outer surface 238 of the needle housing 230 of the needle 200 precludes translation of the needle 200 relative to the retaining nut 300 along the radial direction 2 in the plane perpendicular to the dispensing axis. The needle 200 may similarly be precluded from angular movement relative to the retaining nut 300, where a line extending between the proximal end 204 and the distal end 208 of the needle 200 becomes angularly offset from the dispensing axis 1.

With continued reference to FIG. 8, the retaining nut 300 may include a ledge 332 that extends radially inward towards the dispensing axis 1 from the inner surface 324 of the retaining nut 300. The ledge 332 may be adjacent the distal end 308 of the retaining nut 300 and may define the distal opening 320. At least a portion of the needle 200 is configured to be axially movable along the dispensing axis 1 relative to the ledge 332. The ledge 332 defines a ledge surface 336 defined thereon and facing the receptacle 312. The ledge surface 336 may be adjacent to the inner surface 324. The ledge surface 336 may be configured to be selectively contacted by at least a portion of the needle 200 when the needle 200 is in the seated configuration. In some aspects, as shown in FIG. 6 for example, when the needle 200 is seated in the retaining nut 300, the needle housing 230 is configured to contact the ledge 332. Specifically, the bottom contact surface 262 may be configured to be placed adjacent to, and in contact with, the ledge surface 336. The contact between the ledge surface 336 and the bottom contact surface 262 creates a physical stop between the needle 200 and the retaining nut 300 so as to define the farthest relative position of the needle 200 along the first axial direction 1*a* relative to the retaining nut 300 when the needle 200 is within the receptacle 312 of the retaining nut 300. The bottom contact surface 262 may be in contact with the ledge surface 336 while the outer surfaces 238*a* and 238*b* of the respective proximal portion 230*a* and distal portion 230*b* of the needle housing 230 are in contact with the first portion 324*a* and the second portion 324*b*, respectively, of the inner surface 324 of the retaining nut 300. Such contact between the needle housing 230 along its outer surface 238 and its bottom contact surface 262 precludes undesired movement of the needle 200 relative to the retaining nut 300 when the needle 200 is in the seated configuration within the retaining nut 300.

Figure 5:
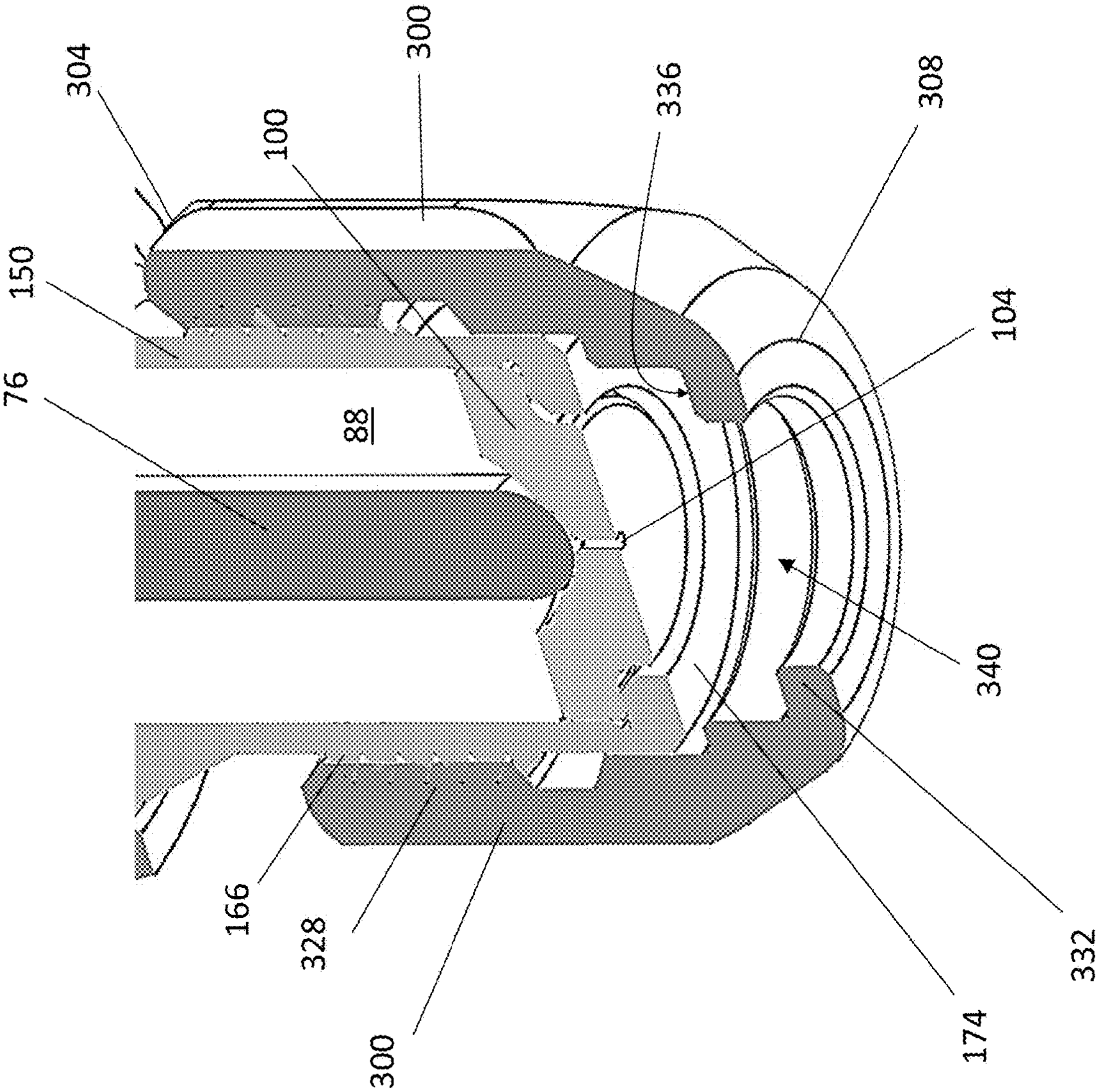
FIG. 5 illustrates an angled cross-sectional view of a portion of the fluid body of FIG. 3.

The seated needle 200 can be secured to the fluid body 16 such that material dispensed from the fluid body 16 can be moved into and through the needle 200. The retaining nut 300, which is configured to hold the needle 200 therein as described above, may be releasably affixed to the fluid body 16. In some aspects (referring again to FIGS. 4-7) the retaining nut 300 may be threadedly affixed to the valve seat holder 150 via the mechanisms described above. The retaining nut 300 may be moved relative to the valve seat holder 150, for example in a helical pattern defined by the engagement of threads 328 and 166, along the dispensing axis 1, for example along the second axial direction 1*b*. The retaining nut 300 may be moved relative to the valve seat holder 150 until the retaining nut 300 is secured to the valve seat holder 150 and/or until the retaining nut 300 is no longer permitted to move along the second axial direction 1*b*. When the retaining nut 300 is sufficiently affixed to the valve seat holder 150, the needle housing 230 of the needle 200 held within the retaining nut 300 may be in contact with the valve seat holder 150. Referring to FIGS. 5 and 11, the valve seat holder 150 may define a distal contact surface 174 defined on the outer surface 151 at the distal end 158 of the valve seat holder 150. The distal contact surface 174 may be dimensioned so as to complement the shape and dimensions of the top contact surface 250 of the needle housing 230. In some aspects, both the top contact surface 250 and the distal contact surface 174 may be substantially planar and be disposed in planes that are parallel to each other. As shown in FIG. 11, when the retaining nut 300 is fully and sufficiently affixed to the valve seat holder 150, at least a portion of the top contact surface 250 of the needle housing 230 is configured to be in contact with at least a portion of the distal contact surface 174 of the valve seat holder 150. In such an arrangement, the needle housing 230 (and, thus, the attached needle shaft 212) are axially fixed relative to the retaining nut 300 and to the fluid body 16 due to the physical contact between the ledge surface 336 and the bottom contact surface 262 and between the distal contact surface 174 of the valve seat holder 150 and the top contact surface 250 of the needle housing 230. This prevents axial movement of the needle 200 during use, which increases accuracy and precision of the dispensing and jetting operations, as well as decreases damage to components.

As can be seen in FIG. 11, when the needle 200 is in contact with, and axially secured by and between, the retaining nut 300 and the valve seat holder 150, a space 340 may be defined between the top contact surface 250 of the needle housing 230 and the valve seat 100. Specifically, the space 340 may be defined, along the dispensing axis 1, between the fluid outlet 104 and the needle inlet 220. The space 340 may be defined along the radial direction 2 by the circumferential engagement of the top contact surface 250 with the distal contact surface 174. In some aspects, a seal 270 may be disposed on the needle 200, on the valve seat holder 150, or both that may be radially spaced along the radial direction 2 away from the dispensing axis 1. In such aspects, the space 340 may be defined in the radial direction 2 by the seal 270. In some embodiments, the distance along the dispensing axis 1 between the fluid outlet 104 and the needle inlet 220 in the space 340 may be between about 0.01 mm and about 2 mm, between about 0.05 mm and about 1 mm, or another suitable range. In some embodiments, this distance may be approximately 0.1 mm. The space 340 may have a diameter measured along the radial direction 2 of between about 0.25 mm and about 2.5 mm, between about 0.5 mm and about 2 mm, or another suitable range. In some embodiments, the diameter may be approximately 1.27 mm.

The particular arrangements of the needle 200 relative to the valve seat 100 described above allow for the space 340 defined therebetween to have relatively smaller volumes compared to existing dispensers. The smaller spaces 340 disclosed herein result in less air being trapped between the needle inlet 220 and the fluid outlet 104 than in existing technology. Less trapped air results in fewer air bubbles being formed in the material being dispensed, which increases the accuracy and precision of the dispensing and/or jetting. Furthermore, a portion of the dispensed material can become mixed with the air, which causes formation of micro bubbles in the deposited material. This may cause undesirable and/or random air pockets within the dispensed material, which can reduce the integrity of the dispensed material. The trapped air within the deposited material takes up volume that would otherwise be filled with the material, thus decreasing the total desired amount of material that is dispensed. This can result in insufficient coverage of the substrate by the dispensed material. By configuring and/or arranging the needle 200 as described above, the space 340 defines a smaller volume for air to become trapped within, thus reducing the disadvantages described above as well as others. In some embodiments, the space 340 may define a volume of between about 0.05 cubic mm and about 1 cubic mm, between about 0.1 cubic mm and about 0.5 cubic mm, or another suitable range. In some specific embodiments, the space 340 may define a volume of approximately 0.24 cubic mm. Existing systems often have volumes that are significantly larger, for example, up to 9 cubic mm in some devices and up to 52 cubic mm in other devices.

The components described throughout this application may comprise various suitable materials, such as metals or plastics. In some aspects, the needle 200, the retaining nut 300, and the valve seat holder 150 may comprise stainless steel, for example, 300 stainless steel. In some aspects, one or more of the components may include polyether ether ketone (PEEK). The components described throughout this application may be machined, cast, molded, three dimensionally printed, and/or the like.

Figure 12:
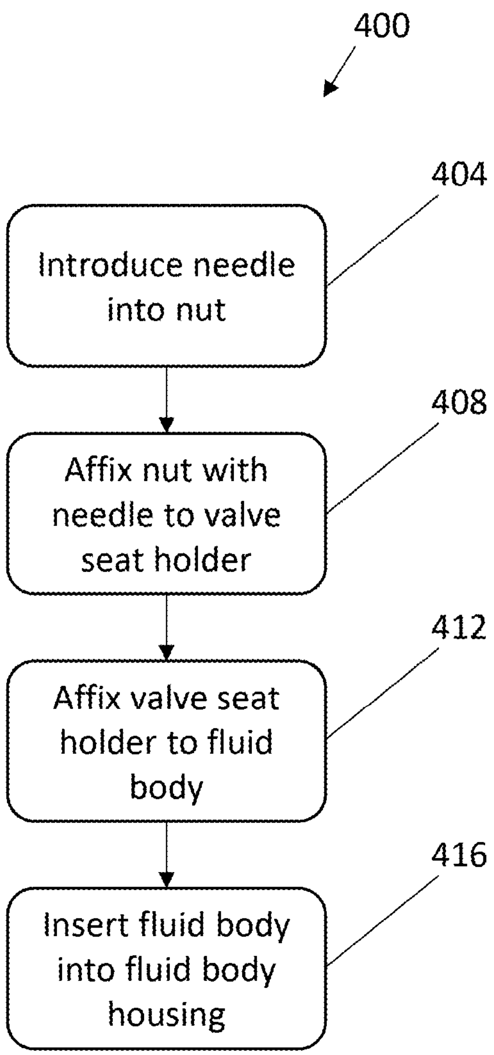
FIG. 12 illustrates a flow chart depicting a process of assembling a fluid body according to an aspect of the disclosure.

The embodiments described above provide various advantages over existing systems due to the ability to disassemble one or multiple components of the systems for cleaning, repair, replacement, and/or the like. Referring to FIG. 12, an exemplary assembly process 400 is depicted. It should be noted that the exemplary assembly process 400 is merely exemplary and may be modified consistent with the various aspects disclosed herein. In particular, the exemplary assembly process 400 may include any one or more aspects of the disclosure described herein. It should be noted that the steps of the exemplary assembly process 400 may be performed in a different order consistent with the aspects described above. Moreover, the exemplary assembly process 400 may be modified to have more or fewer process steps consistent with the various aspects disclosed herein.

In step 404, the needle 200 may be introduced into the retaining nut 300. The needle 200 may be moved into the receptacle 312 through the proximal opening 316 of the retaining nut 300. At least a portion of the needle 200 (for example, a portion of the needle shaft 212) may be moved through the receptacle 312 and out of the receptacle 312 through the distal opening 320 of the retaining nut 300. At least a portion of the needle 200 (for example, the needle housing 230) may be retained within the receptacle 312. When the needle 200 is in the seated configuration within the retaining nut 300, as described throughout this application, the retaining nut 300 may be affixed to the fluid body 16 in step 408. Specifically, the retaining nut 300 may be releasably engaged with the valve seat holder 150, for example, via threads. Preferably, the retaining nut 300 may be moved into engagement with the valve seat holder 150 until the needle 200 is axially fixed within the receptacle 312 between the ledge 332 of the retaining nut 300 and the distal contact surface 174 of the valve seat holder 150. At this stage, the needle 200 is secured relative to the valve seat holder 150, and the needle 200 is configured to receive material therein from the fluid body 16. The retaining nut 300 with the needle 200 may be affixed to the fluid body 16 that is already fully assembled with the rest of the jetting system 10. In some aspects, the retaining nut 300 and the needle 200 may be operatively connected with the valve seat holder 150 when the valve seat holder 150 is engaged with and sufficiently connected with the rest of the fluid body 16. In other aspects, the valve seat holder 150 may receive the retaining nut 300 and the needle 200 while separated from (or not fully engaged with) the fluid body 16. In such aspects, the process 400 may optionally include a step 412, in which the valve seat holder 150 is operatively secured (for example, via threads) to the fluid body 16 as described throughout this specification. It will be appreciated that step 412 may be performed prior to steps 404 and 408 or after steps 404 or 408.

The retaining nut 300 and the needle 200 may be connected to the fluid body 16 (for example, via the valve seat holder 150) when the fluid body 16 is engaged with the rest of the jetting system 10 and ready for operation. In other aspects, the retaining nut 300 and the needle 200 may be operatively connected with the fluid body 16 prior to the fluid body 16 being engaged with the jetting system 10. In such aspects, the process 400 may optionally include a step 416, in which the fluid body 16 is introduced into the fluid body housing 19, and the fluid body housing 19 is secured to the jetting dispenser 12, such that the fluid body 16 is arranged such that the valve assembly 22 is operatively connected to the jetting dispenser 12 to perform the desired jetting or dispensing operations. It should be appreciated that the step 416 may be performed prior to, after, or in between steps 404-412. To disassemble the jetting system 10, one or more of the steps described above may be reversed.

One advantage of the disclosed embodiments is the versatility with which components can be accessed for cleaning or replacement. For example, the needle 200 may be removed from the jetting system 10 by removing the retaining nut 300 from the fluid body 16 either while the fluid body 16 is secured and operatively connected to the jetting dispenser 12 or, alternatively, when the fluid body 16 is removed or otherwise disengaged form the jetting dispenser 12. Similarly, the valve seat holder 150 may be removed from the fluid body 16 for cleaning or replacement, and the valve seat holder 150 may be removed when the retaining nut 300 and the needle 200 are affixed thereto or, alternatively, when the retaining nut 300 and needle 200 are disengaged from the valve seat holder 150. By allowing connections and disconnections of the various components of the jetting system 10 from various configurations of the jetting system 10, a user can efficiently access a desired component without disassembling large portions of the jetting system 10 and without requiring substantial assembly downtime. In some aspects, the needle 200 may become clogged or damaged and may need to be replaced in an efficient manner. As such, a user can disengage the retaining nut 300 from the valve seat holder 150 and remove the needle 200 form the retaining nut 300. A new or cleaned needle 200 may be reintroduced into the retaining nut 300, and the retaining nut 300 can be again engaged with the valve seat holder 150. This process can be accomplished without disassembling other components of the jetting system 10. In some aspects, it may be advantageous to quickly replace one needle 200 with another needle 200 having a different size. Needles 200 can vary in length, shape, and diameter.

In some aspects, it may be desirable to clean or replace the valve seat 100 within the valve seat holder 150. In some aspects, the valve seat 100 is separable from the valve seat holder 150 and can be removed, cleaned, and/or replaced. A different valve seat (for example, one having a different sized fluid outlet 104) may be introduced into the valve seat holder 150. To achieve such replacement, the valve seat holder 150 may be separated from the fluid body 16, and the valve seat 100 may be removed, cleaned, replaced, and/or reinserted into the valve seat holder 150. Alternatively, in aspects where the valve seat 100 is integral with the rest of the valve seat holder 150, the entire valve seat holder 150 may be separated from the retaining nut 300 and the fluid body 16, cleaned/replaced, and reintroduced into engagement with the fluid body 16 and the retaining nut 300 that includes the needle 200 therein.

The dimensions and shapes of the components of the systems disclosed herein improve on existing technology by making components easier to access for cleaning, repair, or replacement. The retaining nut 300 and needle 200 can be affixed to the fluid body 16 without being affixed to the fluid body housing 19, as is common in some existing technology. This allows for easier movement of the retaining nut 300 with the needle 200 with the fluid body 16 relative to the fluid body housing 19 and the jetting dispenser 12. In this way, the fluid body 16 can be removed from the fluid body housing 19 with the retaining nut 300 and needle 200 still attached to the fluid body 16, which simplifies cleaning of the fluid body housing 19 and provides easier access to the retaining nut 300 and needle 200 on the relatively smaller fluid body 16 than when the retaining nut 300 and needle 200 are affixed to the jetting dispenser 12 directly. This has an added benefit of the fluid body housing 19 requiring fewer (or no) engagement features, such as threads, thereon, which allows for easier cleaning of the fluid body housing 19 and any related components, such as a heater.

Another advantage of the disclosed embodiments is the availability of interchangeable needles 200 for different desired uses. As explained above, needles 200 can be manufactured to have different lengths, cross-sectional diameters, tapers, or other parameters that will affect the application of the material being dispensed. The needles 200 may be generally thin enough to fit in areas where the larger dispensing nozzles that are used in existing technologies do not fit. In existing systems, various dispensing nozzles (used in place of the needles 200 disclosed herein) are commonly attached to the jetting dispenser 12. Each of the dispensing nozzles has to have sufficient attachment means that can interact with respective receiving means on the jetting dispenser 12. In some cases, one or more adapters are commonly used to ensure proper attachment and engagement between the dispensing nozzles and the jetting dispenser 12. Such connections between dispensing nozzles and the jetting dispenser 12 would result in larger spaces 340 between the inlets of the dispensing nozzles and the fluid outlet 104 compared to the significantly smaller spaces 340 between the needle inlet 220 and the fluid outlet 104 of the embodiments disclosed herein.

In some aspects, the needle 200 may include a coating thereon to improve dispensing or jetting of the material. The coating may be a phobic coating configured to repel the fluid or material being dispensed. In some aspects, the coating may include fluorine. The coating may be disposed on part of the needle 200. In some aspects, the coating may be applied to the needle shaft 212. In particular embodiments, at least the distal end 208 of the needle 200 may include the phobic coating thereon. Presence of the phobic coating allows for the material being dispensed to separate from the needle 200 more easily than in the absence of the phobic coating. The phobic coating decreases surface tension between the needle shaft 212 at the needle outlet 224 and the dispensed or jetted material, thus decreasing the amount of material that remains adhered to the needle 200 due to surface tension rather than being separated from the needle 200 and moved towards the substrate. This allows for better accuracy and precision in dispensing or jetting the desired amount of material onto the substrate; if material is left on the needle 200, then the substrate receives less material than is desired during a dispensing or jetting process; whereas the material left over on the needle 200 can accumulate and eventually overcome the surface tension and be deposited on the substrate later, resulting in more material being applied to the substrate than desired.

Figure 13:
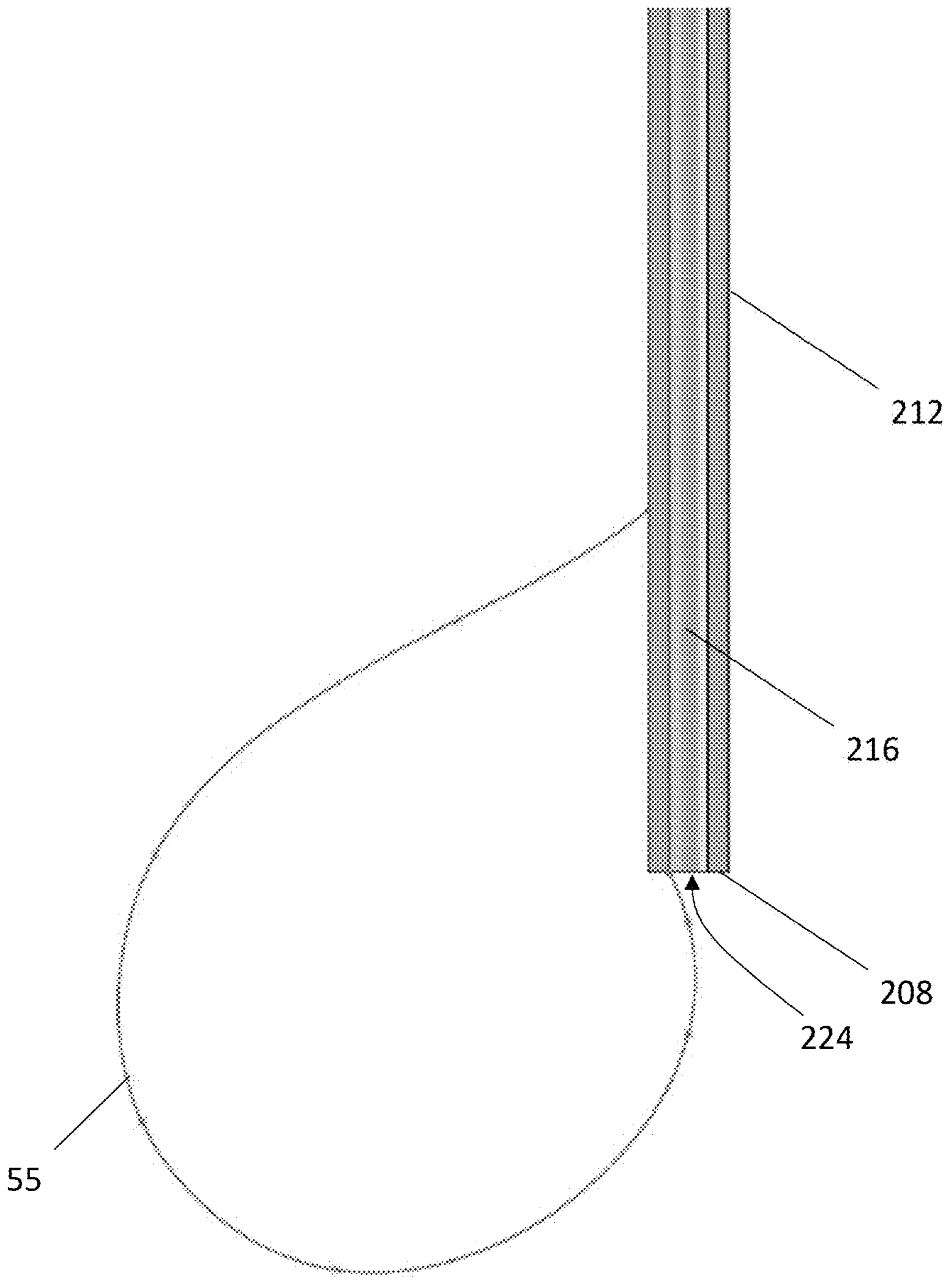
FIG. 13 illustrates a portion of a dispensing needle with a droplet formed thereon.

In existing systems, phobic coating is commonly applied to the needle shaft 212 on the exterior surface of the needle shaft 212 and on the interior surface that defines the lumen 216. However, presence of the phobic coating in the lumen 216 results in undesirable extrication of the material from inside the lumen 216 to outside of the lumen through the needle outlet 224. Such extrication can occur between individual dispensing or jetting actuations. The extricated material may form a droplet adjacent the distal end of an applicator in existing systems. An exemplary droplet 55 is depicted in FIG. 13 with respect to an exemplary needle 200, such as a needle 200 of one of the embodiments depicted throughout this application. This droplet 55 can accumulate over one or more actuations of the jetting system until the droplet 55 becomes sufficiently large and heavy that it overcomes the surface tension holding the droplet 55 together and attached to the needle 200. When the droplet 55 separates from the needle 200, it can be deposited onto the substrate. This results in an undesired, and difficult to measure, application of material onto the substrate.

Figure 14:
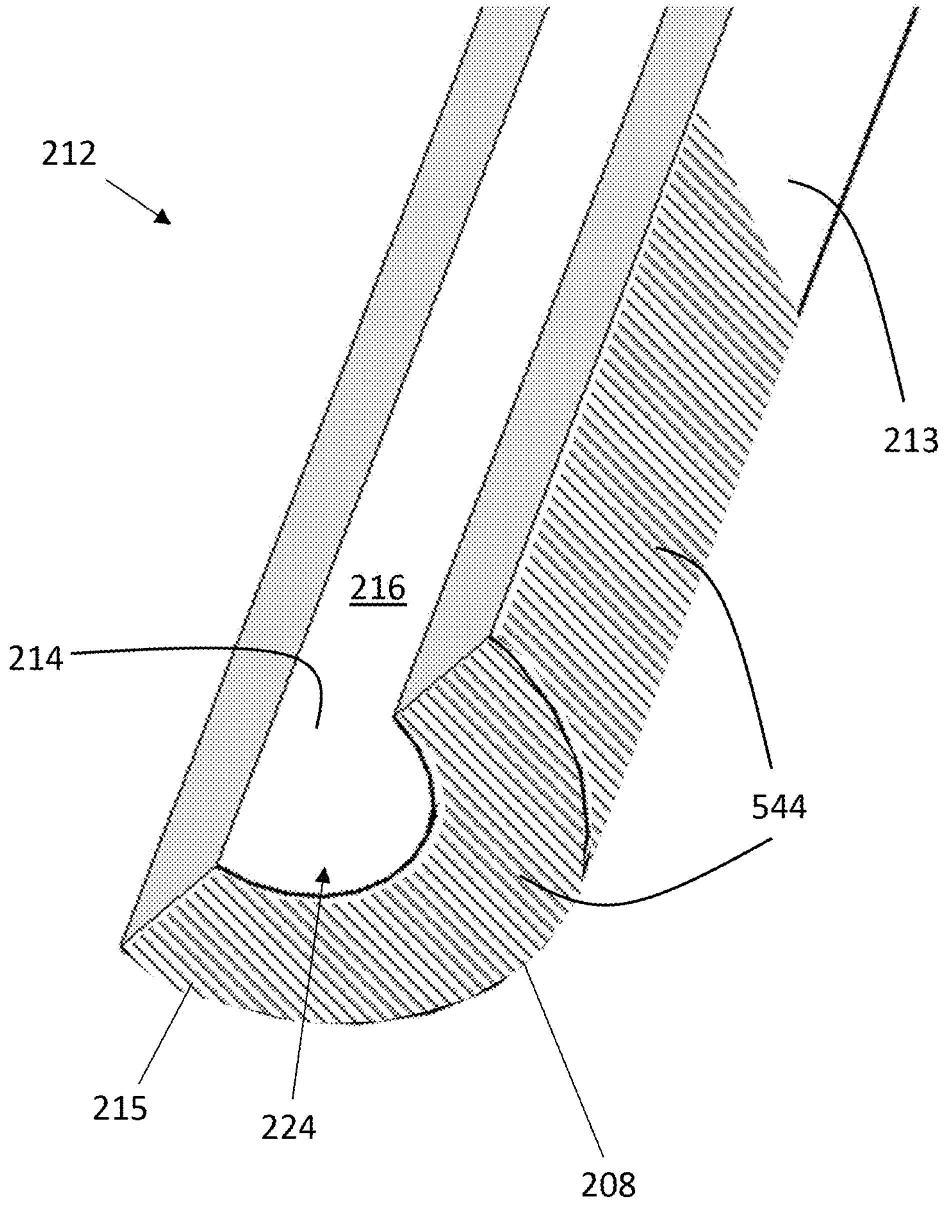
FIG. 14 illustrates an angled cross-sectional view of a portion of a dispensing needle according to an aspect of the disclosure.
Figure 15:
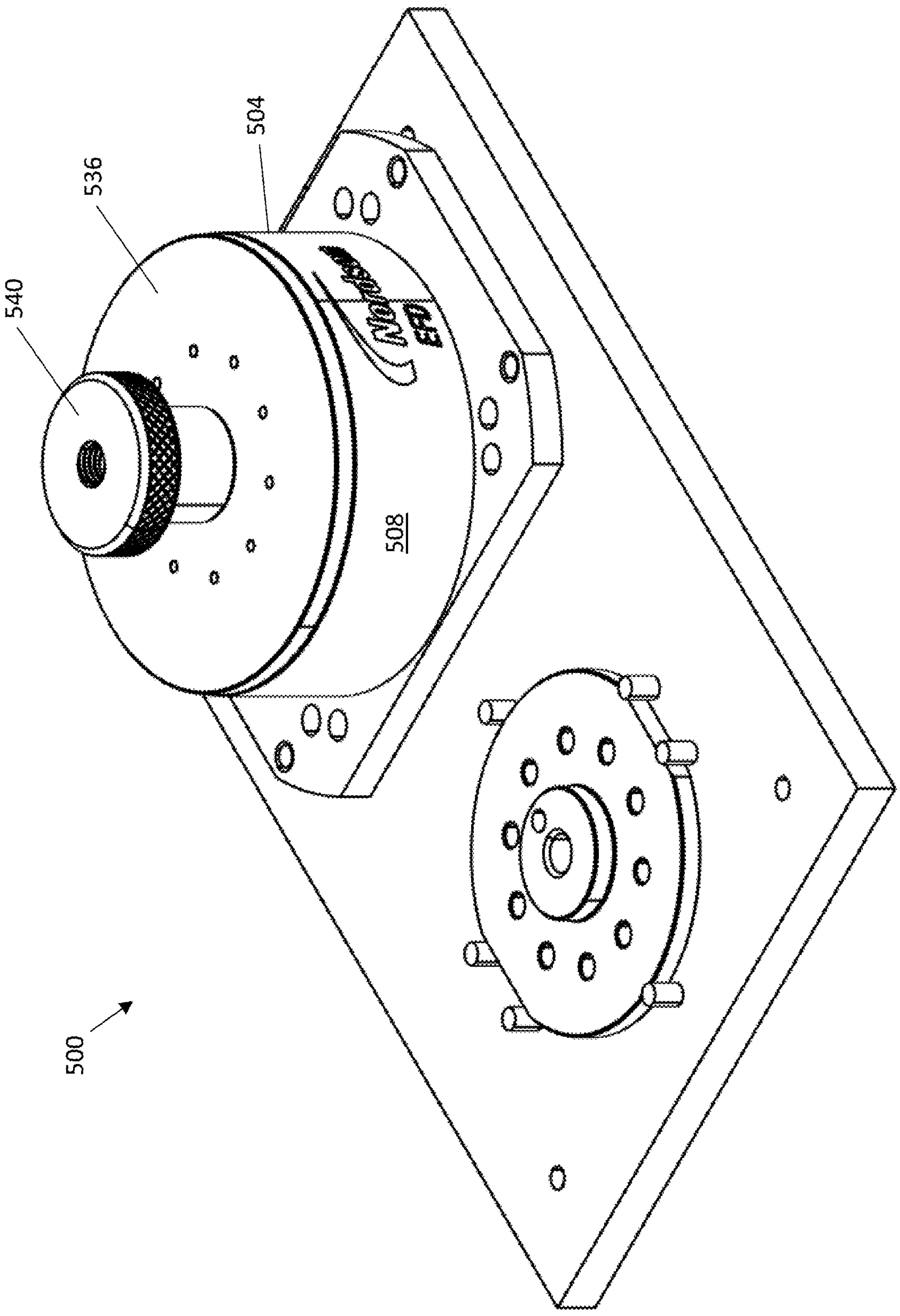
FIG. 15 illustrates a needle coating apparatus according to an aspect of the disclosure.
Figure 16:
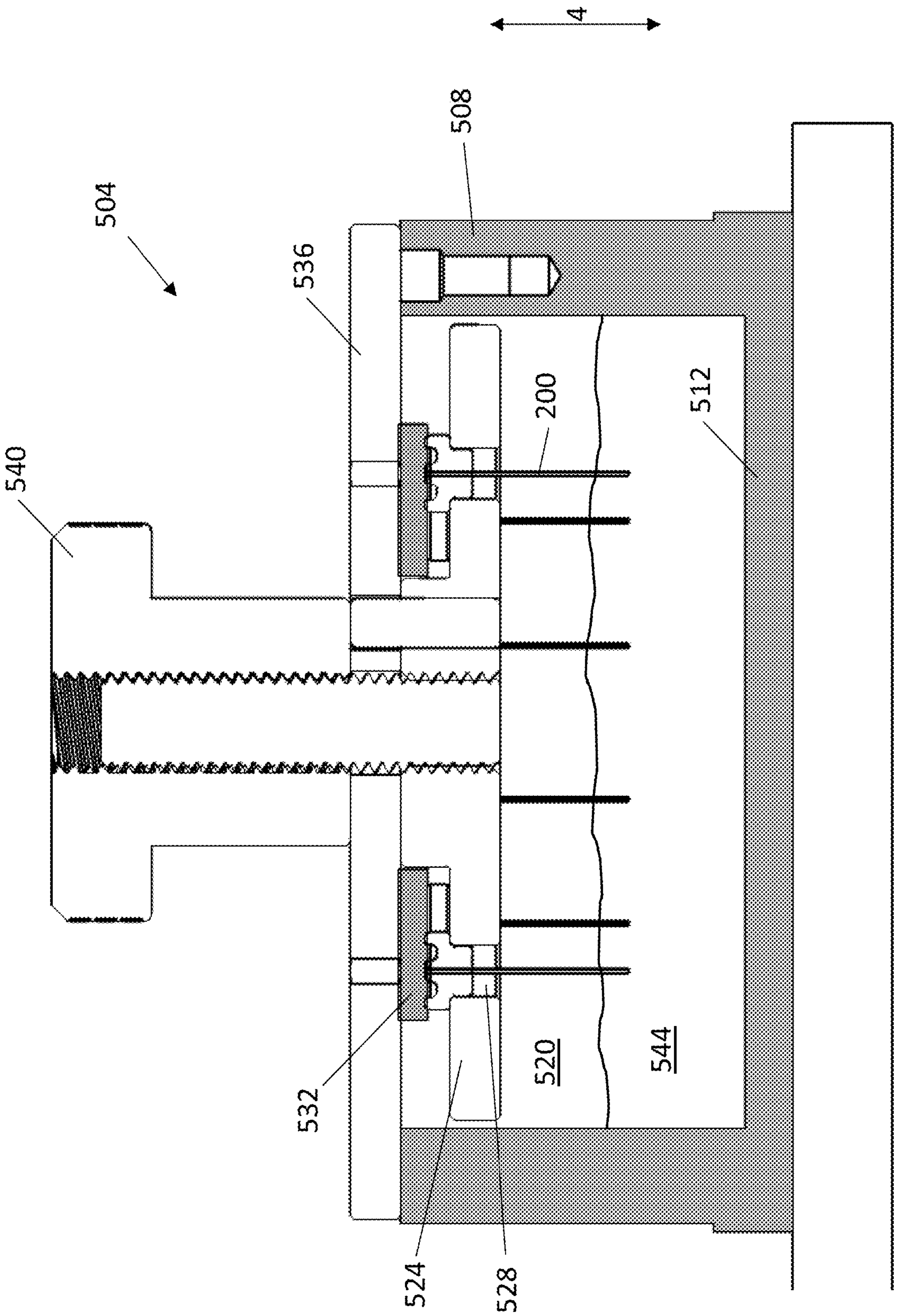
FIG. 16 illustrates a cross-sectional view of a portion of the needle coating apparatus of FIG. 15.

To overcome this problem, the embodiments of the needle 200 disclosed throughout this application may be configured to receive the phobic coating thereon such that the phobic coating is disposed on portions of the needle 200 to facilitate separation of the material when the jetting dispenser 12 is actuated substantially without forming droplets 55 or other manifestations of stagnant material on the needle 200. Referring to FIG. 14, a portion of the needle shaft 212 of the needle 200 is depicted according to an embodiment. The shaft includes an outer surface 213 and an inner surface 214 that is spaced from the outer surface 213 along the radial direction 2 towards the dispensing axis 1. The lumen 216 is defined by the inner surface 214. The needle shaft 212 defines a distal surface 215 disposed at the distal end 208 of the needle 200. The distal surface 215 extends between the outer surface 213 and the inner surface 214 along the radial direction 2. The distal surface may be substantially planar and may be disposed in a plane perpendicular to the dispensing axis 1, although it will be appreciated that other shapes, dimensions, and orientations of the distal surface 215 are envisioned.

A phobic coating 544 may be disposed on the outer surface 213. In some aspects, the entire needle shaft 212 may receive the phobic coating 544, for example, between the proximal end 204 and the distal end 208 of the needle 200. In other aspects, some, but not all, of the needle shaft 212 may receive the phobic coating 544. In some particular examples, the phobic coating 544 may be applied to up to about one-quarter of the needle shaft 212, up to about one-third of the needle shaft 212, up to about one-half of the needle shaft 212, up to about two-thirds of the needle shaft 212, up to about three-quarters of the needle shaft 212, or another proportion of the needle shaft 212. The phobic coating 544 may be applied from the distal end 208 of the needle 200 along the second axial direction 1*b* towards the proximal end 204 of the needle 200. The phobic coating 544 may be applied such that the entirety of the applied phobic coating 544 is uninterrupted along the outer surface 213 of the needle shaft 212. In some aspects, the phobic coating 544 is applied at, or immediately adjacent to, the distal end 208 of the needle 200. In some aspects, the needle 200 is configured to receive the phobic coating 544 on the distal surface 215. The phobic coating 544 on the distal surface 215 may be adjacent the phobic coating 544 disposed on the outer surface 213.

In some embodiments, the phobic coating 544 is not applied to the inner surface 214 of the needle shaft 212. It may be advantageous to preclude the phobic coating 544 from being applied to the inner surface 214. In existing applications of coatings to dispensers, the coating is not actively removed or precluded from entering the interior of the dispensers. Upon application of the coating in existing systems, a portion of the applied coating can enter the interior of the dispenser and be disposed in the lumen of the dispenser. This results in undesirable functionality and operation as described above in relation to FIG. 13. Referring to FIGS. 15-18, a coating apparatus 500 is depicted that is configured to allow the phobic coating 544 to be applied to the needle 200 while precluding the phobic coating 544 from entering the lumen 216 and being deposited on the inner surface 214 of the needle shaft 212. In particular, the coating apparatus 500 may ensure the phobic coating 544 is substantially applied to the outer surface 213 and the phobic coating 544 is substantially prevented from being applied to the inner surface 214. The coating apparatus 500 may be designed, structured, and/or configured to releasably receive the needle 200 therein. The coating apparatus 500 includes a body 504 having a lower surface 512 and an upper surface 536 spaced from the lower surface 512 along a vertical direction 4. One or more walls 508 extend between the lower surface 512 and the upper surface 536. The body 504 defines a chamber 520 therein between the upper surface 536, the lower surface 512, and the one or more walls 508. In some aspects, the body 504 may be substantially cylindrical, such that a single wall 508 extends between the upper surface 536 and the lower surface 512 and circumferentially around the chamber 520.

Figure 17:
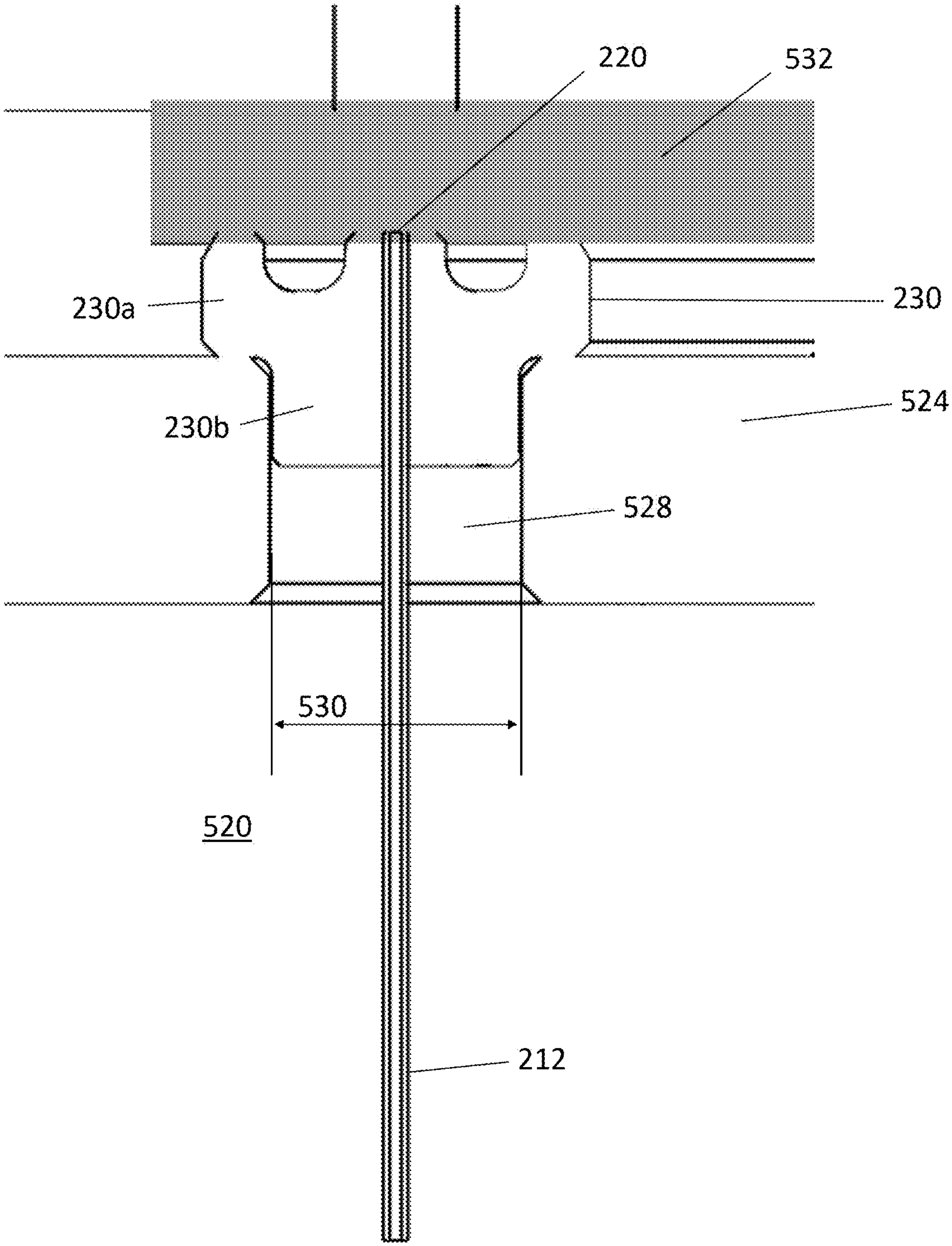
FIG. 17 illustrates another cross-sectional view of a portion of the needle coating apparatus of FIG. 15.
Figure 18:
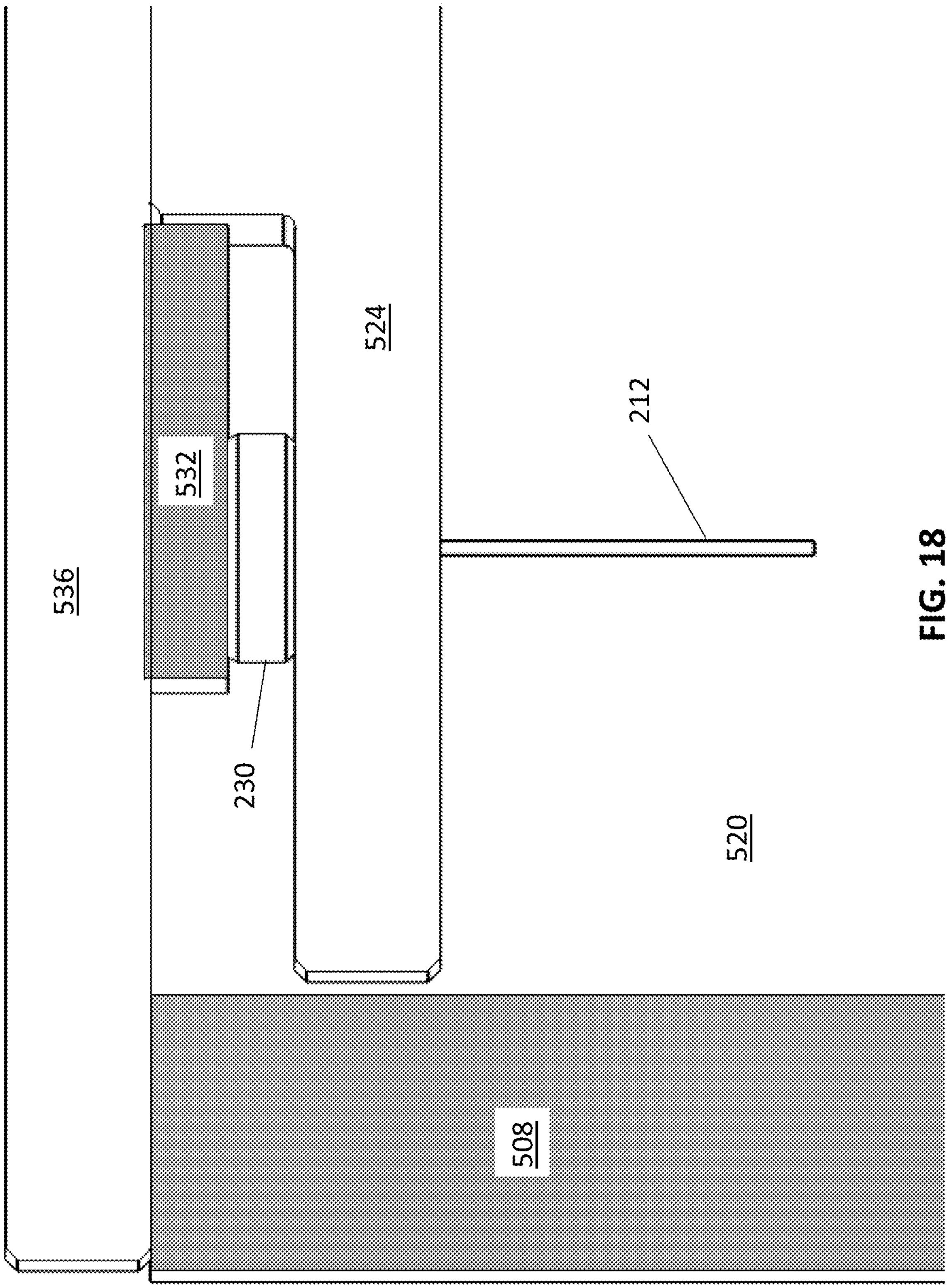
FIG. 18 illustrates a side view of a portion of the needle coating apparatus of FIG. 15.

A holding plate 524 may be disposed within the chamber 520 between the lower surface 512 and the upper surface 536. The holding plate 524 may be configured to receive one or more needles 200 that are to receive the phobic coating 544 thereon. An aperture 528 may extend through the holding plate 524. The holding plate 524 may have a plurality of apertures 528. Each aperture 528 may be configured to removably receive a needle 200 therethrough. As shown in FIG. 17, the aperture 528 may be dimensioned such that a portion of the needle 200 is permitted to be moved through the aperture 528, while another portion of the needle 200 is precluded from being moved through the aperture 528. In some aspects, the aperture 528 may be large enough to permit the needle shaft 212 to move therethrough, but not large enough to allow for at least a portion of the needle housing 230 to move therethrough. In some aspects, as shown in FIG. 17, the aperture 528 may be dimensioned such that the distal portion 230*b* of the needle housing 230 may be configured to be received into the aperture 528, while the proximal portion 230*a* may be precluded from being received into the aperture 528. The aperture 528 may have the same cross-sectional shape as the needle housing 230, for example, a circular cross-section. The aperture 528 may define a diameter 530. In some aspects as disclosed above, the diameter 530 may be at least slightly larger than the second diameter 242*b* of the distal portion 230*b* of the needle housing 230, such that at least the distal portion 230*b* of the needle housing 230 is permitted to fit into the aperture 528. In some aspects, it may be advantageous to retain the needle 200 within the aperture 528 substantially secured, such that the needle 200 may be precluded from movement in a direction perpendicular to the vertical direction 4 when the needle 200 is in the aperture 528. In such aspects, the diameter 530 of the aperture 528 may be only slightly greater than the second diameter 242*b* of the distal portion 230*b* of the needle housing 230, such that sufficient tolerance exists to permit insertion and removal of the needle housing 230 into and out of the aperture 528 along the vertical direction 4, while substantially precluding movement along a direction perpendicular to the vertical direction 4 when the needle housing 230 is in the aperture 528.

The chamber 520 may be configured to receive the phobic coating 544 therein. It will be understood that the amount of phobic coating 544 in the chamber 520 can depend on the number of needles 200 being received into the coating apparatus 500, the length of each needle 200 (measured between the proximal end 204 and the distal end 208), and the desired portion of the needle 200 that is intended to be coated. In operation, when the needle 200 (or needles 200) is received into the aperture 528, at least a portion of the needle shaft 212 of the needle 200 can extend into the chamber 520 between the lower surface 512 and the holding plate 524. At least a portion of the needle shaft 212 can be submerged in the phobic coating 544 disposed in the chamber 520.

In some aspects, a seal 532 may be disposed adjacent the needle inlet 220 when the needle 200 is arranged within the aperture 528. The seal 532 contacts the proximal end 204 of the needle 200, such that the needle inlet 220 is covered. The seal 532 can form an air-tight seal between itself and the needle 200, such that air or other gases cannot enter or exit the lumen 216 through the needle inlet 220. By closing the needle inlet 220, the seal 532 precludes air that is disposed in the lumen 216 from being displaced through the needle inlet 220 by the phobic coating 544 as the distal end 208 and the needle outlet 224 are placed in fluid communication with the phobic coating 544 in the chamber 520. If the seal 532 is not present, the phobic coating 544 can enter the lumen 216 through the needle outlet 224, thus contacting the inner surface 214 of the needle shaft 212. The phobic coating 544 may further travel up the lumen 216 toward the proximal end 204 of the needle 200 by capillary action. The seal 532 prevents the air in the lumen 216 from exiting out of the needle inlet 220, and thus does not allow for creation of a vacuum inside the lumen 216 that can be filled by the phobic coating 544. This allows for the phobic coating 544 to be in contact with, and to be applied to, the desired portions of the needle 200 (such as the distal surface 215 and at least a portion of the outer surface 213) while substantially precluding the inner surface 214 from receiving the phobic coating 544. However, the discrete and/or limited application of the phobic coating 544 may be implemented a number of different ways and such are contemplated by the disclosure.

The upper surface 536 may be a closure, cover, or lid that is configured to be placed over the chamber 520 with the needles 200 and the phobic coating 544 therein. The lid can include a securing means 540 configured to releasably attach the lid to the body 504. The securing means 540 may include a threaded attachment, a snap fit, a lever, a clamp, or another suitable fixating mechanism. In some aspects, the seal 532 can be forcefully held against the proximal end 204 of each needle 200 disposed on the holding plate 524 to form the air-tight seal. The seal 532 may be placed in compression between each needle 200 and the lid by actuation of the securing means 540 to cause movement of the lid towards the holding plate 524. To release the air-tight seal, the securing means 540 may be actuated in the opposite direction, and the lid may be moved away from the holding plate 524.

Figure 19:
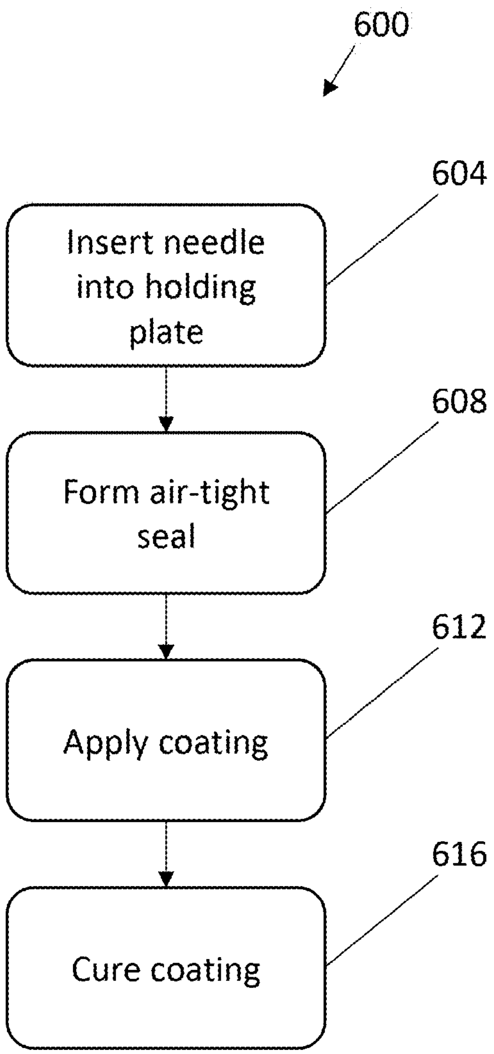
FIG. 19 illustrates a flow chart depicting a process of coating a dispensing needle according to an aspect of the disclosure.

Referring to a coating process 600 illustrated in FIG. 19, it should be noted that the coating process 600 is merely exemplary and may be modified consistent with the various aspects disclosed herein. In particular, the coating process 600 may include any one or more aspects of the disclosure described herein. It should be noted that the steps of the coating process 600 may be performed in a different order consistent with the aspects described above. Moreover, the coating process 600 may be modified to have more or fewer process steps consistent with the various aspects disclosed herein.

In step 604, the needle 200 may be introduced into the coating apparatus 500 as described above. The coating apparatus 500 may be configured to receive one or a plurality of needles 200. It will be understood that the overall size of the coating apparatus 500, as well as the number of apertures 528, will depend on the number of needles 200 that are intended to be received in the coating apparatus 500 at one time.

In step 608, the air-tight seal may be formed between the seal 532 and the needle 200 as explained above. The coating apparatus 500 may include a plurality of seals 532, with individual seals 532 being placed in contact with their respective needles 200, or, alternatively, the coating apparatus 500 may include a single seal 532 configured to contact all of the needles 200 in the coating apparatus 500 simultaneously. However, the discrete and/or limited application of the phobic coating 544 may be implemented a number of different ways and such are contemplated by the disclosure.

In step 612, the phobic coating 544 may be introduced into the chamber 520. The phobic coating may be any suitable coating material. In some aspects, the phobic coating 544 includes fluorine. The needles 200 are retained at least partly submerged in the phobic coating 544 for a predetermined time. This duration can depend on the particular coating being utilized and on other specifications of the coating process. The phobic coating 544 may be introduced into the chamber 520 prior to the needles 200 being introduced therein or, alternatively, after the needles 200 have been secured to the holding plate 524.

In step 616, the applied phobic coating 544 may be cured to ensure that the coating has the desired parameters and is permanently affixed to the needles 200. The curing step may include allowing the needles 200 to dry to evaporate any excess portion of the phobic coating 544. In some aspects, the coated needles 200 may be placed in a curing oven (not shown) to heat the needles 200 to a predetermined temperature that ensures the phobic coating 544 is cured and/or secured to the needles 200 and exhibits the desired phobic properties. It will be appreciated that the particular parameters of curing the coating, such as steps, temperature, duration, etc., will depend on the coating being used and on the material comprising the needles 200. In some aspects, the needles 200 are configured to be retained within the coating apparatus 500 throughout the entire duration of the coating process 600.

In some aspects, optional additional steps may be employed during the coating process 600. For example, the needles 200 may first be cleaned appropriately before secured in the coating apparatus 500. In some aspects, the needles 200 may be treated with plasma to remove unwanted materials (such as oils) present on the surfaces of the needle shaft 212 to be coated. It will be appreciated that other steps may be utilized that are commonplace in similar coating procedures, and this disclosure is not limited to the specific exemplary steps described above. Unless noted otherwise, one or more of the steps depicted in the coating process 600 may be performed in different order relative to other steps of the coating process 600, and steps may be repeated a plurality of times to achieve a desired coating effect.

The following are a number of nonlimiting EXAMPLES of aspects of the disclosure. One EXAMPLE includes: EXAMPLE 1. A fluid body for use with a jetting dispenser, the fluid body configured to receive a fluid therein and to jet the fluid therefrom, the fluid body includes: a fluid inlet configured to receive the fluid from a fluid source; a fluid outlet configured to discharge the fluid from the fluid body; a chamber defined between the fluid inlet and the fluid outlet and configured to receive the fluid therein; a valve seat disposed in the chamber, the fluid outlet extending through the valve seat; a valve element configured for reciprocal movement within the chamber between a first position, in which the valve element is in contact with the valve seat, and a second position, in which the valve element is spaced from the valve seat; a dispensing needle separable from the fluid body and configured to receive the fluid from the fluid outlet; and a retaining nut configured to releasably secure the dispensing needle to the fluid body such that the dispensing needle contacts the fluid body adjacent the fluid outlet.

The above-noted EXAMPLE may further include any one or a combination of more than one of the following EXAMPLES: 2. The fluid body of any EXAMPLE herein, where the dispensing needle includes: a shaft having a proximal end and a distal end opposite the proximal end; a lumen defined through the shaft between the proximal end and the distal end; a needle inlet disposed at the proximal end and in fluid communication with the lumen, the needle inlet being configured to receive the fluid from the fluid outlet into the lumen; a needle outlet disposed at the distal end and in fluid communication with the lumen; and a housing encompassing at least a portion of the shaft between the proximal end and the distal end, where the dispensing needle defines an upper contact surface configured to be placed in contact with the fluid body, and where, when the dispensing needle is in contact with the fluid body, a space is defined between the dispensing needle and the fluid body, the space being adjacent to and in fluid communication with the fluid outlet and with the needle inlet. 3. The fluid body of any EXAMPLE herein, where the housing of the needle is substantially cylindrical. 4. The fluid body of any EXAMPLE herein, where the housing of the needle includes a proximal portion and a distal portion adjacent the proximal portion, where the proximal portion has a first diameter, the distal portion has a second diameter, and the first diameter is greater than the second diameter. 5. The fluid body of any EXAMPLE herein, where the upper contact surface is configured to receive a seal thereon, such that when the dispensing needle is in contact with the fluid body, the seal is held in compression between the dispensing needle and the fluid body. 6. The fluid body of any EXAMPLE herein, where the space defines a volume of between about 0.05 cubic mm and about 1 cubic mm. 7. The fluid body of any EXAMPLE herein, where the retaining nut is configured to receive the dispensing needle therein, the retaining nut being configured to releasably connect to the fluid body with the dispensing needle in the retaining nut. 8. The fluid body of any EXAMPLE herein, where the retaining nut defines a receptacle therein between a proximal opening at a proximal end of the retaining nut and a distal opening at a distal end of the retaining nut opposite the proximal end, the dispensing needle being receivable into the receptacle, where the retaining nut includes a ledge extending radially into the receptacle adjacent the distal end and defining the distal opening, where the proximal opening has a first diameter, the distal opening has a second diameter, and the first diameter of the proximal opening is greater than the second diameter of the distal opening, where the retaining nut is configured to receive the dispensing needle into the receptacle through the proximal opening, and where the retaining nut is configured to permit a portion of, but not an entirety of, the dispensing needle to be moved out of the receptacle through the distal opening. 9. The fluid body of any EXAMPLE herein, where the retaining nut defines an inner surface having a first portion and a second portion adjacent the first portion, the first portion having a first diameter that is greater than a second diameter of the second portion, where, when the dispensing needle is received into the retaining nut, the proximal portion of the housing is received into the first portion of the retaining nut, and the distal portion of the housing is received into the second portion of the retaining nut. 10. The fluid body of any EXAMPLE herein, where, when the dispensing needle is secured in contact with the fluid body via the retaining nut, the dispensing needle is precluded from movement relative to the fluid body. 11. The fluid body of any EXAMPLE herein, where the valve seat is disposed on a valve seat holder that is releasably connectable to the fluid body. 12. The fluid body of any EXAMPLE herein, where the retaining nut is configured to releasably attach to the valve seat holder. 13. The fluid body of any EXAMPLE herein, where the retaining nut includes threads configured to releasably engage with corresponding threads on the fluid body. 14. The fluid body of any EXAMPLE herein, where the dispensing needle includes a coating thereon, the coating configured to reduce surface tension. 15. The fluid body of any EXAMPLE herein, where the coating includes fluorine. 16. The fluid body of any EXAMPLE herein, where the dispensing needle includes the coating on an outer surface thereof and is devoid of the coating on an inner surface thereof that defines the lumen. 17. A jetting system, includes: a fluid body according to any EXAMPLE herein; a jetting dispenser having an actuator configured to cause reciprocal movement of the valve element towards and away from the valve seat to cause the fluid in the fluid chamber to be moved out of the fluid outlet and into the dispensing needle. 18. The jetting system of any EXAMPLE herein 7, includes a fluid body housing configured to removably receive the fluid body therein, the fluid body housing being movable between a first position, in which the fluid body is secured to the jetting dispenser such that the valve element is actuatable by the actuator of the jetting dispenser, and a second position, in which the fluid body is spaced from the jetting dispenser, where, when the fluid body housing is in the second position, the fluid body is removable from the fluid body housing and separable from the jetting system.

One EXAMPLE includes: EXAMPLE 19. A needle coating holder for applying a coating to a dispensing needle for use with a jetting system, the needle coating holder includes: a body defining a chamber therein that is configured to receive the coating; a needle holding plate adjacent to the chamber, the needle holding plate defining an aperture extending therethrough, the aperture being configured to receive the dispensing needle therein; and a cover selectively placeable in contact with the dispensing needle disposed in the needle holding plate, where an air-tight seal is formed between the cover and a needle inlet of the dispensing needle when the cover is placed in contact with the dispensing needle.

The above-noted EXAMPLE may further include any one or a combination of more than one of the following EXAMPLES: 20. The needle coating holder of any EXAMPLE herein, includes an elastomeric seal between the cover and the dispensing needle.

One EXAMPLE includes: EXAMPLE 21. A fluid body for use with a jetting dispenser, the fluid body configured to receive a fluid therein and to jet the fluid therefrom, the fluid body includes: a fluid inlet configured to receive the fluid from a fluid source; a fluid outlet configured to discharge the fluid from the fluid body; a chamber defined between the fluid inlet and the fluid outlet and configured to receive the fluid therein; a valve seat disposed in the chamber, the fluid outlet extending through the valve seat; a valve element configured for reciprocal movement within the chamber between a first position, in which the valve element is in contact with the valve seat, and a second position, in which the valve element is spaced from the valve seat; a dispensing needle separable from the fluid body and configured to receive the fluid from the fluid outlet; and a retaining component configured to releasably secure the dispensing needle to the fluid body such that the dispensing needle contacts the fluid body adjacent the fluid outlet.

The above-noted EXAMPLE may further include any one or a combination of more than one of the following EXAMPLES: 22. The fluid body of any EXAMPLE herein, where the dispensing needle includes: a shaft having a proximal end and a distal end opposite the proximal end; a lumen defined through the shaft between the proximal end and the distal end; a needle inlet disposed at the proximal end and in fluid communication with the lumen, the needle inlet being configured to receive the fluid from the fluid outlet into the lumen; a needle outlet disposed at the distal end and in fluid communication with the lumen; and a housing encompassing at least a portion of the shaft between the proximal end and the distal end, where the dispensing needle defines an upper contact surface configured to be placed in contact with the fluid body, and where, when the dispensing needle is in contact with the fluid body, a space is defined between the dispensing needle and the fluid body, the space being adjacent to and in fluid communication with the fluid outlet and with the needle inlet. 23. The fluid body of any EXAMPLE herein, where the housing of the needle is substantially cylindrical. 24. The fluid body of any EXAMPLE herein, where the housing of the needle includes a proximal portion and a distal portion adjacent the proximal portion, where the proximal portion has a first diameter, the distal portion has a second diameter, and the first diameter is greater than the second diameter. 25. The fluid body of any EXAMPLE herein, where the upper contact surface is configured to receive a seal thereon, such that when the dispensing needle is in contact with the fluid body, the seal is held in compression between the dispensing needle and the fluid body. 26. The fluid body of any EXAMPLE herein, where the space defines a volume of between about 0.05 cubic mm and about 1 cubic mm. 27. The fluid body of any EXAMPLE herein, where the retaining component is configured to receive the dispensing needle therein, the retaining component being configured to releasably connect to the fluid body with the dispensing needle in the retaining component. 28. The fluid body of any EXAMPLE herein, where the retaining component defines a receptacle therein between a proximal opening at a proximal end of the retaining component and a distal opening at a distal end of the retaining component opposite the proximal end, the dispensing needle being receivable into the receptacle, where the retaining component includes a ledge extending radially into the receptacle adjacent the distal end and defining the distal opening, where the proximal opening has a first diameter, the distal opening has a second diameter, and the first diameter of the proximal opening is greater than the second diameter of the distal opening, where the retaining component is configured to receive the dispensing needle into the receptacle through the proximal opening, and where the retaining component is configured to permit a portion of, but not an entirety of, the dispensing needle to be moved out of the receptacle through the distal opening. 29. The fluid body of any EXAMPLE herein, where the retaining component defines an inner surface having a first portion and a second portion adjacent the first portion, the first portion having a first diameter that is greater than a second diameter of the second portion, where, when the dispensing needle is received into the retaining component, the proximal portion of the housing is received into the first portion of the retaining component, and the distal portion of the housing is received into the second portion of the retaining component. 30. The fluid body of any EXAMPLE herein, where, when the dispensing needle is secured in contact with the fluid body via the retaining component, the dispensing needle is precluded from movement relative to the fluid body. 31. The fluid body of any EXAMPLE herein, where the valve seat is disposed on a valve seat holder that is releasably connectable to the fluid body. 32. The fluid body of any EXAMPLE herein, where the retaining component is configured to releasably attach to the valve seat holder. 33. The fluid body of any EXAMPLE herein, where the retaining component includes threads configured to releasably engage with corresponding threads on the fluid body. 34. The fluid body of any EXAMPLE herein, where the dispensing needle includes a coating thereon, the coating configured to reduce surface tension. 35. The fluid body of any EXAMPLE herein, where the coating includes fluorine. 36. The fluid body of any EXAMPLE herein, where the dispensing needle includes the coating on an outer surface thereof and is devoid of the coating on an inner surface thereof that defines the lumen. 37. A jetting system, includes: a fluid body according to any EXAMPLE herein; a jetting dispenser having an actuator configured to cause reciprocal movement of the valve stem towards and away from the valve seat to cause the fluid in the fluid chamber to be moved out of the fluid outlet and into the dispensing needle. 38. The jetting system of any EXAMPLE herein, includes a fluid body housing configured to removably receive the fluid body therein, the fluid body housing being movable between a first position, in which the fluid body is secured to the jetting dispenser such that the valve stem is actuatable by the actuator of the jetting dispenser, and a second position, in which the fluid body is spaced from the jetting dispenser, where, when the fluid body housing is in the second position, the fluid body is removable from the fluid body housing and separable from the jetting system.

One EXAMPLE includes: EXAMPLE 39. A fluid body for use with a jetting dispenser, the fluid body configured to receive a fluid therein and to jet the fluid therefrom, the fluid body includes: a fluid inlet configured to receive the fluid from a fluid source; a fluid outlet configured to discharge the fluid from the fluid body; a chamber defined between the fluid inlet and the fluid outlet and configured to receive the fluid therein; a valve seat disposed in the chamber, the fluid outlet extending through the valve seat; a valve element configured for reciprocal movement within the chamber between a first position, in which the valve element is in contact with the valve seat, and a second position, in which the valve element is spaced from the valve seat; and a dispensing needle separable from the fluid body and configured to receive the fluid from the fluid outlet; where the dispensing needle includes a coating thereon, the coating configured to reduce surface tension.

The above-noted EXAMPLE may further include any one or a combination of more than one of the following EXAMPLES: 40. The fluid body of any EXAMPLE herein, where the coating includes fluorine. 41. The fluid body of any EXAMPLE herein, where the dispensing needle includes the coating on an outer surface thereof and is devoid of the coating on an inner surface thereof that defines the lumen. 42. The fluid body of any EXAMPLE herein, where the dispensing needle includes: a shaft having a proximal end and a distal end opposite the proximal end; a lumen defined through the shaft between the proximal end and the distal end; a needle inlet disposed at the proximal end and in fluid communication with the lumen, the needle inlet being configured to receive the fluid from the fluid outlet into the lumen; a needle outlet disposed at the distal end and in fluid communication with the lumen; and a housing encompassing at least a portion of the shaft between the proximal end and the distal end, where the dispensing needle defines an upper contact surface configured to be placed in contact with the fluid body, and where, when the dispensing needle is in contact with the fluid body, a space is defined between the dispensing needle and the fluid body, the space being adjacent to and in fluid communication with the fluid outlet and with the needle inlet. 43. The fluid body of any EXAMPLE herein, where the housing of the needle is substantially cylindrical. 44. The fluid body of any EXAMPLE herein, where the housing of the needle includes a proximal portion and a distal portion adjacent the proximal portion, where the proximal portion has a first diameter, the distal portion has a second diameter, and the first diameter is greater than the second diameter. 45. The fluid body of any EXAMPLE herein, where the upper contact surface is configured to receive a seal thereon, such that when the dispensing needle is in contact with the fluid body, the seal is held in compression between the dispensing needle and the fluid body. 46. The fluid body of any EXAMPLE herein, where the space defines a volume of between about 0.05 cubic mm and about 1 cubic mm. 47. The fluid body of any EXAMPLE herein, where the retaining component is configured to receive the dispensing needle therein, the retaining component being configured to releasably connect to the fluid body with the dispensing needle in the retaining component. 48. The fluid body of any EXAMPLE herein, where the retaining component defines a receptacle therein between a proximal opening at a proximal end of the retaining component and a distal opening at a distal end of the retaining component opposite the proximal end, the dispensing needle being receivable into the receptacle, where the retaining component includes a ledge extending radially into the receptacle adjacent the distal end and defining the distal opening, where the proximal opening has a first diameter, the distal opening has a second diameter, and the first diameter of the proximal opening is greater than the second diameter of the distal opening, where the retaining component is configured to receive the dispensing needle into the receptacle through the proximal opening, and where the retaining component is configured to permit a portion of, but not an entirety of, the dispensing needle to be moved out of the receptacle through the distal opening. 49. The fluid body of any EXAMPLE herein, where the retaining component defines an inner surface having a first portion and a second portion adjacent the first portion, the first portion having a first diameter that is greater than a second diameter of the second portion, where, when the dispensing needle is received into the retaining component, the proximal portion of the housing is received into the first portion of the retaining component, and the distal portion of the housing is received into the second portion of the retaining component. 50. The fluid body of any EXAMPLE herein, where, when the dispensing needle is secured in contact with the fluid body via the retaining component, the dispensing needle is precluded from movement relative to the fluid body. 51. The fluid body of any EXAMPLE herein, where the valve seat is disposed on a valve seat holder that is releasably connectable to the fluid body. 52. The fluid body of any EXAMPLE herein, where the retaining component is configured to releasably attach to the valve seat holder. 53. The fluid body of any EXAMPLE herein, where the retaining component includes threads configured to releasably engage with corresponding threads on the fluid body.

While systems and methods have been described in connection with the various embodiments of the various figures, it will be appreciated by those skilled in the art that changes could be made to the embodiments without departing from the broad inventive concept thereof. It is understood, therefore, that this disclosure is not limited to the particular embodiments disclosed, and it is intended to cover modifications within the spirit and scope of the present disclosure as defined by the claims.

What is claimed is:

1. A fluid body for use with a jetting dispenser, the fluid body configured to receive a fluid therein and to jet the fluid therefrom, the fluid body comprising:

a fluid inlet configured to receive the fluid from a fluid source;

a fluid outlet configured to discharge the fluid from the fluid body;

a chamber defined between the fluid inlet and the fluid outlet and configured to receive the fluid therein;

a valve seat disposed in the chamber, the fluid outlet extending through the valve seat;

a valve element configured for reciprocal movement within the chamber between a first position, in which the valve element is in contact with the valve seat, and a second position, in which the valve element is spaced from the valve seat;

a dispensing needle separable from the fluid body and configured to receive the fluid from the fluid outlet; and a retaining component defining a receptacle therein between a proximal opening at a proximal end of the retaining component and having a first diameter and a distal opening at a distal end of the retaining component opposite the proximal end and having a second diameter less than the first diameter, the retaining component including a ledge extending radially into the receptacle adjacent the distal end and defining the distal opening, the retaining component configured to receive the dispensing needle into the receptacle through the proximal opening and to releasably secure the dispensing needle to the fluid body such that the dispensing needle contacts the fluid body adjacent the fluid outlet and the retaining component releasably connects to the fluid body with the dispensing needle in the retaining component, wherein the fluid body is configured to jet the fluid therefrom along a dispensing direction, the retaining component is configured to permit a portion of, but not an entirety of the dispensing needle to be moved out of the receptacle through the distal opening, and at least a portion of the retaining component is distal to the valve seat along the dispensing direction.

2. The fluid body of claim 1, wherein the dispensing needle comprises:

a shaft having a proximal end and a distal end opposite the proximal end;

a lumen defined through the shaft between the proximal end and the distal end;

a needle inlet disposed at the proximal end and in fluid communication with the lumen, the needle inlet being configured to receive the fluid from the fluid outlet into the lumen;

a needle outlet disposed at the distal end and in fluid communication with the lumen; and a housing encompassing at least a portion of the shaft between the proximal end and the distal end, wherein the dispensing needle defines an upper contact surface configured to be placed in contact with the fluid body, and wherein, when the dispensing needle is in contact with the fluid body, a space is defined between the dispensing needle and the fluid body, the space being adjacent to and in fluid communication with the fluid outlet and with the needle inlet.

3. The fluid body of claim 2, wherein the housing of the dispensing needle is substantially cylindrical.

4. The fluid body of claim 2, wherein the housing of the dispensing needle includes a proximal portion and a distal portion adjacent the proximal portion, wherein the proximal portion has a first diameter, the distal portion has a second diameter, and the first diameter is greater than the second diameter.

5. The fluid body of claim 4, wherein the retaining component defines an inner surface having a first portion and a second portion adjacent the first portion, the first portion having a first diameter that is greater than a second diameter of the second portion, wherein, when the dispensing needle is received into the retaining component, the proximal portion of the housing is received into the first portion of the retaining component, and the distal portion of the housing is received into the second portion of the retaining component.

6. The fluid body of claim 2, wherein the upper contact surface is configured to receive a seal thereon, such that when the dispensing needle is in contact with the fluid body, the seal is held in compression between the dispensing needle and the fluid body.

7. The fluid body of claim 2, wherein the space defines a volume of between about 0.05 cubic mm and about 1 cubic mm.

8. The fluid body of claim 1, wherein, when the dispensing needle is secured in contact with the fluid body via the retaining component, the dispensing needle is precluded from movement relative to the fluid body.

9. The fluid body of claim 1, wherein the valve seat is disposed on a valve seat holder that is releasably connectable to the fluid body.

10. The fluid body of claim 9, wherein the retaining component is configured to releasably attach to the valve seat holder.

11. The fluid body of claim 1, wherein the retaining component includes threads configured to releasably engage with corresponding threads on the fluid body.

12. The fluid body of claim 1, wherein the dispensing needle includes a coating thereon, the coating configured to reduce surface tension.

13. The fluid body of claim 12, wherein the coating includes fluorine.

14. The fluid body of claim 12, wherein the dispensing needle includes the coating on an outer surface thereof and is devoid of the coating on an inner surface thereof that defines a lumen.

15. The fluid body of claim 1, wherein the retaining component defines a retaining nut.

16. A jetting system, comprising:

a fluid body, configured to receive a fluid therein and to jet the fluid therefrom, the fluid body comprising:

a fluid inlet configured to receive the fluid from a fluid source;

a fluid outlet configured to discharge the fluid from the fluid body;

a chamber defined between the fluid inlet and the fluid outlet and configured to receive the fluid therein;

a valve seat disposed in the chamber, the fluid outlet extending through the valve seat;

a valve element configured for reciprocal movement within the chamber between a first position, in which the valve element is in contact with the valve seat, and a second position, in which the valve element is spaced from the valve seat;

a dispensing needle separable from the fluid body and configured to receive the fluid from the fluid outlet; and a retaining component configured to releasably secure the dispensing needle to the fluid body such that the dispensing needle contacts the fluid body adjacent the fluid;

a jetting dispenser having an actuator configured to cause reciprocal movement of a valve element towards and away from the valve seat to cause the fluid in the chamber to be moved out of the fluid outlet and into the dispensing needle; and a fluid body housing configured to removably receive the fluid body therein, the fluid body housing being movable between a first position, in which the fluid body is secured to the jetting dispenser such that the valve element is actuatable by the actuator of the jetting dispenser, and a second position, in which the fluid body is spaced from the jetting dispenser, wherein, when the fluid body housing is in the second position, the fluid body is removable from the fluid body housing and separable from the jetting system.

17. The jetting system of claim 16, wherein the fluid body is configured to jet the fluid therefrom along a dispensing direction and at least a portion of the retaining component is distal to the valve seat along the dispensing direction.

18. A fluid body for use with a jetting dispenser, the fluid body configured to receive a fluid therein and to jet the fluid therefrom, the fluid body comprising:

a fluid inlet configured to receive the fluid from a fluid source;

a fluid outlet configured to discharge the fluid from the fluid body;

a chamber defined between the fluid inlet and the fluid outlet and configured to receive the fluid therein;

a valve seat disposed in the chamber, the fluid outlet extending through the valve seat;

a valve element configured for reciprocal movement within the chamber between a first position, in which the valve element is in contact with the valve seat, and a second position, in which the valve element is spaced from the valve seat; and a dispensing needle separable from the fluid body and comprising a needle inlet configured to receive the fluid from the fluid outlet, wherein, when the dispensing needle is in contact with the fluid body, a space is defined between the dispensing needle and the fluid body, the space being adjacent to and in fluid communication with the fluid outlet and with the needle inlet.

19. The fluid body of claim 18, wherein the dispensing needle comprises:

a shaft having a proximal end and a distal end opposite the proximal end;

a lumen defined through the shaft between the proximal end and the distal end;

the needle inlet disposed at the proximal end and in fluid communication with the lumen, the needle inlet being configured to receive the fluid from the fluid outlet into the lumen;

a needle outlet disposed at the distal end and in fluid communication with the lumen; and a housing encompassing at least a portion of the shaft between the proximal end and the distal end, and wherein the dispensing needle defines an upper contact surface configured to be placed in contact with the fluid body.

20. The fluid body of claim 19, wherein the housing of the dispensing needle is substantially cylindrical.

21. The fluid body of claim 19, wherein the housing of the dispensing needle includes a proximal portion and a distal portion adjacent the proximal portion, wherein the proximal portion has a first diameter, the distal portion has a second diameter, and the first diameter is greater than the second diameter.

22. The fluid body of claim 21, further comprising a retaining component, wherein the retaining component defines an inner surface having a first portion and a second portion adjacent the first portion, the first portion having a first diameter that is greater than a second diameter of the second portion, wherein, when the dispensing needle is received into the retaining component, the proximal portion of the housing is received into the first portion of the retaining component, and the distal portion of the housing is received into the second portion of the retaining component.

23. The fluid body of claim 22, wherein, when the dispensing needle is secured in contact with the fluid body via the retaining component, the dispensing needle is precluded from movement relative to the fluid body.

24. The fluid body of claim 23, wherein the valve seat is disposed on a valve seat holder that is releasably connectable to the fluid body.

25. The fluid body of claim 24, wherein the retaining component is configured to releasably attach to the valve seat holder.

26. The fluid body of claim 25, wherein the retaining component includes threads configured to releasably engage with corresponding threads on the fluid body.

27. The fluid body of claim 19, wherein the upper contact surface is configured to receive a seal thereon, such that when the dispensing needle is in contact with the fluid body, the seal is held in compression between the dispensing needle and the fluid body.

28. The fluid body of claim 19, wherein the space defines a volume of between about 0.05 cubic mm and about 1 cubic mm.

29. The fluid body of claim 19, further comprising a retaining component, wherein the retaining component is configured to receive the dispensing needle therein, the retaining component being configured to releasably connect to the fluid body with the dispensing needle in the retaining component.

30. The fluid body of claim 29, wherein the retaining component defines a receptacle therein between a proximal opening at a proximal end of the retaining component and a distal opening at a distal end of the retaining component opposite the proximal end, the dispensing needle being receivable into the receptacle, wherein the retaining component includes a ledge extending radially into the receptacle adjacent the distal end and defining the distal opening, wherein the proximal opening has a first diameter, the distal opening has a second diameter, and the first diameter of the proximal opening is greater than the second diameter of the distal opening, wherein the retaining component is configured to receive the dispensing needle into the receptacle through the proximal opening, and wherein the retaining component is configured to permit a portion of, but not an entirety of, the dispensing needle to be moved out of the receptacle through the distal opening.

31. The fluid body of claim 18, wherein the dispensing needle includes a coating thereon, the coating configured to reduce surface tension.

32. The fluid body of claim 31, wherein the coating includes fluorine.

33. The fluid body of claim 32, wherein the dispensing needle includes the coating on an outer surface thereof and is devoid of the coating on an inner surface thereof that defines a lumen.

* * * * *